United States Patent
Kato et al.

(10) Patent No.: US 8,085,448 B2
(45) Date of Patent: Dec. 27, 2011

(54) IMAGE READING APPARATUS AND CONTROL METHOD THEREOF

(75) Inventors: Shinobu Kato, Yokohama (JP); Katsuhiko Okitsu, Tokyo (JP); Hirokazu Higuchi, Fujisawa (JP)

(73) Assignee: Canon Denshi Kabushiki Kaisha, Chichibu-Shi, Saitama-Ken (JP)

( * ) Notice: Subject to any disclaimer, the term of this patent is extended or adjusted under 35 U.S.C. 154(b) by 921 days.

(21) Appl. No.: 12/056,963

(22) Filed: Mar. 27, 2008

(65) Prior Publication Data

US 2008/0239416 A1    Oct. 2, 2008

(30) Foreign Application Priority Data

Mar. 29, 2007 (JP) ................... 2007/089576
Mar. 29, 2007 (JP) ................... 2007/089583
Mar. 29, 2007 (JP) ................... 2007/089584

(51) Int. Cl.
H04N 1/04 (2006.01)
(52) U.S. Cl. ......... 358/474; 358/487; 358/472; 358/496
(58) Field of Classification Search ................ 358/474, 358/487, 472, 496, 497, 498
See application file for complete search history.

(56) References Cited

U.S. PATENT DOCUMENTS

| | | | | |
|---|---|---|---|---|
| 5,126,540 A | | 6/1992 | Kashiwagi et al. | 235/375 |
| 6,862,115 B1 * | | 3/2005 | Kondo | 358/474 |
| 7,755,813 B2 * | | 7/2010 | Nishikawa et al. | 358/497 |
| 2003/0202114 A1 * | | 10/2003 | Takizawa et al. | 348/335 |
| 2007/0223061 A1 | | 9/2007 | Tanaka et al. | 358/497 |
| 2007/0223062 A1 | | 9/2007 | Tanaka et al. | 358/497 |

FOREIGN PATENT DOCUMENTS

| | | |
|---|---|---|
| JP | 02-109463 | 4/1990 |
| JP | 6-164863 | 6/1994 |
| JP | 2761736 | 3/1998 |
| JP | 10-210202 | 8/1998 |
| JP | 11-249492 | 9/1999 |
| JP | 2000-270152 | 9/2000 |
| JP | 2001-272829 | 10/2001 |
| JP | 2002-258545 | 9/2002 |
| JP | 2004-48184 | 2/2004 |
| JP | 3645737 | 2/2005 |
| JP | 2005-204007 * | 7/2005 |

* cited by examiner

Primary Examiner — Houshang Safaipour
(74) Attorney, Agent, or Firm — Fitzpatrick, Cella, Harper & Scinto

(57) ABSTRACT

An image reading apparatus capable of continually conveying a plurality of originals in a stable manner while cleaning a contact glass of an image sensor and reducing streaks occurring in read images. An image sensor reads an original image via a contact member which the conveyed original may contact. A cleaning member, being provided on a turning member which is able to rotate or swing and disposed at a position opposing the image sensor, cleans the contact member's surface which the original may contact. The turning member is turned by a driving unit. A controlling unit controls the driving unit to turn the turning member so that cleaning of the contact member is performed by the cleaning member after the original has passed an image reading position of the image sensor and before a subsequent original reaches the image reading position.

28 Claims, 28 Drawing Sheets

IMAGE READING APPARATUS AND CONTROL METHOD THEREOF

BACKGROUND OF THE INVENTION

1. Field of the Invention

The present invention relates to an image reading apparatus such as a scanner which reads an image on an original conveyed using a conveying mechanism such as a roller, and a control method of the image reading apparatus.

2. Description of the Related Art

An example of a conventional image reading apparatus is shown in FIG. 30.

The image reading apparatus shown in FIG. 30 includes a lower unit 301 and an upper unit 302 supported so as to be vertically turnable via a hinge 313 with respect to the lower unit 301. A turning movement of the upper unit 302 causes an original conveying section to open and/or close. An opened state and/or a closed state of the original conveying section is detected by an opening-closing detection sensor 337. A convey path is formed when the original conveying section assumes a closed state to enable conveying of an original.

The image reading apparatus starts an image reading operation based on a control signal from a manual operation section, not shown, or from the outside of the image reading apparatus. First, an original mounting table 307 is elevated until an uppermost original 308 of a stack of originals placed on the original mounting table 307 abuts a pickup roller 306. After the original mounting table 307 is sufficiently elevated, the original 308 is fed to the convey path by the pickup roller 306 and a feeding roller 304 that is a feed unit.

When two or more originals 308 are picked up by the pickup roller 306 at the same time, the originals are separated by a retard roller 311 and fed to the convey path one by one. Images on each of originals 308 sent to the convey path to be separated and fed are read by an image sensor 312 on the convey path, and image data is transferred to an image processing section, not shown. The front end and the rear end of an original 308 conveyed along the convey path are detected by a registration sensor 314. Conveying timing and the like are controlled by signals from the registration sensor 314.

A platen roller 310 is disposed at a position opposing the image sensor 312 across the convey path of the original 308. The platen roller 310 is used as a background member that causes the background color of an image of the original 308 read by the image sensor 312 to be changeable. A predetermined clearance gap is provided between the platen roller 310 and the image sensor 312.

More specifically, the platen roller 310 is arranged so that, for example, an approximately half of the outer peripheral surface thereof is a black portion and the remaining approximately half of the outer peripheral surface thereof is a white portion. By controlling the rotational movement of the platen roller 310, the black portion or the white portion can be disposed at a position opposing the image sensor 312 to switch the background color of the original.

In this case, by switching the background color of the original to black, the contour and the like of the original is enhanced. As a result, the outline of the read original can be easily recognized to enable image data consistent with the outline to be created in an easier manner. With a double-sided printed original having largish light transmittance, the background color is preferably switched to black since the printing and the like on a reverse side is enhanced by white background due to the largish light transmittance of the original. Conversely, in the case of an original having print of rather light color and the like and with no printing on a reverse side thereof, it is possible to enhance the printing and the like by switching the background color to white.

The platen roller 310 is driven by a platen roller driving motor 315 such as a stepping motor or the like, and rotates when switching background colors of an original and when cleaning a reading surface of the image sensor 312. When reading an original, the platen roller 310 is controlled so as to stop by a constant holding torque applied by the driving motor 315.

The original 308 having passed the image sensor 312 is conveyed downstream by the conveying roller 303 and subsequently discharged to a discharge tray 309 by a discharge roller 305. The above-described series of original conveying operations is subjected to timing control so as to ensure predetermined original intervals and is continually performed until all of the originals 308 placed on the original mounting table 307 are conveyed. After all of the originals 308 placed on the original mounting table 307 are conveyed, the original mounting table 307 is lowered and returned to its home position. An image reading apparatus that performs the switching of original background colors using a white reference plate and a black board for shading correction instead of a platen roller has been also proposed (refer to Japanese Patent No. 2761736).

A cleaning member 316 that cleans a reading surface of the image sensor 312 is disposed on the platen roller 310. When the platen roller 310 is rotated, the cleaning member 316 passes while contacting the reading surface of the image sensor 312 to clean the reading surface (for example, refer to Japanese Patent No. 3645737).

When consecutively reading originals, cleaning of the reading surface of the image sensor 312 by the cleaning member 316 and a rotational movement of the platen roller 310 to realize a set background color are performed at predetermined timing.

However, with the image reading apparatus described in Japanese Patent No. 3645737, an elastic member protruding from an outer periphery of the platen roller extends in a longitudinal direction of the image sensor which is the main scanning direction in image reading. Therefore, when the platen roller continues to rotate during the conveying of an original, there are cases where the front end of the original catches on the elastic member.

In addition, there may be cases where the elastic member is inadvertently captured in a read image or where variations in density or defocusing occurs due to rippling caused when the elastic member presses a part of the original against a contact glass of the image sensor.

Under such circumstances, conventionally, the contact glass surface of the image sensor is cleaned by, for instance, rotating the platen roller only once immediately after power-on operation or prior to starting image reading of a plurality of originals, or after completion of image reading of a plurality of originals.

However, if contaminants such as paper dust adhere to the contact glass during continuous conveying of a plurality of originals, streaks will occur on the read image read by the image sensor. In addition, if the contaminants remain adhered, streaks will continue to occur even in read images read after the aforementioned original.

With the conventional image reading apparatus described above, when a large number of originals are conveyed, stains adhering to the cleaning member 316 during cleaning of the reading surface of the image sensor 312 becomes deposition. However, after cleaning the reading surface of the image sensor 312, the cleaning member 316 is retreated from the convey path to location inside the apparatus. Therefore, cleaning of deposition of stains adhering on the cleaning member 316 requires disassembling the mechanism around the platen roller 310 and cleaning the cleaning member 316 after removing the platen roller 310 from the apparatus main body, raising a problem in that cleanup work of the cleaning member 316 requires a significant amount of effort.

Furthermore, with the conventional image reading apparatus described above, in the case where a skew of the original 308 occurs, a corner of the original 308 is delayed by the skew, whereby cleaning performed at predetermined timing may cause damages to the original 308 or jamming.

On the other hand, it is conceivable that, the platen roller 310 is rotated to perform cleaning of the reading surface of the image sensor 312 using the cleaning member 316 only when the original has been discharged and conveying of subsequent original has not begun.

However, with such an arrangement the number of read sheets per unit time will be reduced.

SUMMARY OF THE INVENTION

The present invention provides an image reading apparatus and a control method thereof capable of continually conveying a plurality of originals in a stable manner while cleaning a contact glass of an image sensor and reducing streaks occurring in read images.

The present invention further provides an image reading apparatus and a control method thereof capable of readily removing stains adhering to and accumulated on a cleaning member.

The present invention yet further provides an image reading apparatus and a control method thereof capable of preventing damages to an original, paper jams or the like and, at the same time, suppressing or preventing a reduction in the number of read sheets per unit time.

In a first aspect of the present invention, there is provided an image reading apparatus comprising a conveying unit adapted to convey an original, an image sensor adapted to read an image of the original via a contact member which an original conveyed by the conveying unit may contact, a turning member adapted to rotate or swing and disposed at a position opposing the image sensor, a cleaning member disposed on the turning member and adapted to clean the contact member's surface which the original may contact, a driving unit adapted to turn the turning member, and a controlling unit adapted to control the driving unit to turn the turning member so that cleaning of the contact member is performed by the cleaning member after the original has passed an image reading position of the image sensor and before a subsequent original reaches the image reading position.

An image reading apparatus can further comprise an original detecting unit adapted to detect at least one of a front end and a rear end of an original conveyed by the conveying unit, and the controlling unit is adapted to control the driving unit so that, when the original detecting unit detects a front end of an original, the surface of the contact member is cleaned by the cleaning member before the front end of that original reaches the image reading position, and/or when the original detecting unit detects a rear end of an original, the surface of the contact member is cleaned by the cleaning member after the rear end of that original has passed the image reading position of the image sensor.

An image reading apparatus can further comprise a skew detecting unit adapted to detect a skewed state of an original conveyed by the conveying unit, and the controlling unit controls the driving unit so that the movement of the turning member is changed based on detection information detected by the skew detecting unit.

The conveying unit can be an original conveying section provided so as to be openable and/or closeable and which forms a convey path in its closed state, and the image reading apparatus can further comprise either a open-close detecting unit adapted to detect an opened state and/or a closed state of the original conveying section or an opening operation detecting unit adapted to detect an operation to cause the original conveying section to get into an opened state, and the controlling unit controls the driving unit based on detection information detected by the open-close detecting unit or the opening operation detecting unit so as to hold the turning member at a position where the cleaning member is in exposed state.

In a second aspect of the present invention, there is provided an image reading apparatus comprising a conveying unit adapted to convey an original, an image sensor adapted to read an original image via a contact member which an original conveyed by the conveying unit may contact, a turning member disposed at a position opposing the image sensor, a cleaning member provided so as to protrude from the turning member and which is adapted to contact the contact member and clean the contact member's surface during turning of the turning member, and a driving unit adapted to cause the turning member to turn, and the cleaning member has a shape such that not all areas of contact portion of the cleaning member which contacts the contact member contact the contact member at one time.

In a third aspect of the present invention, there is provided an image reading apparatus comprising a conveying unit adapted to convey an original, an image sensor adapted to read an original image via a contact member which an original conveyed by the conveying unit may contact, an original detecting unit adapted to detect an original conveyed by the conveying unit, a cleaning member adapted to clean the contact member's surface which the original may contact, a driving unit adapted to drive the cleaning member, and a controlling unit adapted to control the driving unit based on detection information detected by the original detecting unit so that cleaning of the contact member is performed by the cleaning member after the original has passed an image reading position of the image sensor and before a subsequent original reaches the image reading position.

In a fourth aspect of the present invention, there is provided a control method of an image reading apparatus including a conveying unit adapted to convey an original, an image sensor adapted to read an original image via a contact member which an original conveyed by the conveying unit may contact, a cleaning member provided on a turning member disposed at a position opposing the image sensor and which is adapted to clean the contact member's surface which the original may contact, and a driving unit adapted to turn the turning member, the control method comprising an original detecting step of detecting at least one of a front end and a rear end of an original conveyed along a convey path, and a controlling step of controlling the driving unit to turn the turning member so that the surface of the contact member is cleaned by the cleaning member before a front end of an original reaches the image reading position of the image sensor when the front end of the original is detected in the original detecting step and/or controlling the driving unit so that the surface of the contact member is cleaned by the cleaning member after a rear end of an original has passed the image reading position of the image sensor when the rear end of the original is detected in the original detecting step.

In a fifth aspect of the present invention, there is provided a control method of an image reading apparatus including a conveying unit adapted to convey an original, an image sensor adapted to read an original image via a contact member which an original conveyed by the conveying unit may contact, a cleaning member provided on a roller disposed at a position opposing the image sensor and which is adapted to clean the contact member's surface which the original may contact, and a driving unit adapted to turn the roller, the control method comprising an original detecting step of detecting an original conveyed along a convey path, and a controlling step of controlling the driving unit to rotate the roller so that the roller is rotated according to a detection of an original in the original detecting step, and the controlling step enables controlling of the driving unit so as to rotate the roller at a first rotational speed at which the circumferential speed of the roller equals or exceeds an original conveying speed, a second rotational speed at which the circumferential speed of the roller is under the original conveying speed and an arbitrarily-configured third rotational speed, and the controlling step controls the driving unit to rotate the roller so that, the roller is rotated at the third rotational speed and the surface of the contact member is cleaned by the cleaning member before an original enters between the roller and the contact member, the roller is rotated at the first rotational speed when the original enters between the roller and the contact member, and the rotational speed of the roller is changed to the second rotational speed after the front end of the original has passed between the roller and the contact member.

In a sixth aspect of the present invention, there is provided a control method of an image reading apparatus including an original conveying section provided so as to be openable and/or closeable and which forms a convey path for conveying an original in its closed state, an image sensor adapted to read an original image via a contact member which an original conveyed along the convey path may contact, a cleaning member provided on a roller disposed at a position opposing the image sensor and which is adapted to clean the surface of the contact member, and a driving unit adapted to rotate the roller, the control method comprising a detecting step of detecting an opened state and/or a closed state of the original conveying section or a step for detecting an operation to cause the original conveying section to assume an opened state, and a controlling step of controlling the driving unit so as to hold the cleaning member in a exposed state when an opened state of the original conveying section or an operation to cause the original conveying section to assume an opened state is detected.

In a seventh aspect of the present invention, there is provided an image reading apparatus comprising a conveying unit adapted to convey an original, an image sensor adapted to read an original image via a contact member which an original conveyed by the conveying unit may contact, a vibrator adapted to vibrate the contact member, and a controlling unit adapted to control the vibrator to vibrate the contact member after an original has passed an image reading position of the image sensor and before a subsequent original reaches the image reading position.

In an eights aspect of the present invention, there is provided An image reading apparatus comprising a conveying unit adapted to convey an original, an image sensor adapted to read an original image via a contact member which an original conveyed by the conveying unit may contact, a platen roller including a white portion and disposed at a position opposing the image sensor, a cleaning member provided on the platen roller and which is adapted to clean the surface of the contact member, on which surface an original may contact the contact member, a driving unit adapted to turn the platen roller, and a controlling unit adapted to control the driving unit so that the contact member is cleaned by the cleaning member and that the white portion of the platen roller is opposed to the image sensor upon acquisition of shading correction data.

According to the present invention, it is possible to continually convey a plurality of originals in a stable manner while reducing streaks occurring in read images since a contact glass of an image sensor can be cleaned by a cleaning member mounted on a rotating member.

In addition, according to the present invention, stains adhering to and accumulated on a cleaning member can be readily removed since the cleaning member is stopped in a state where the cleaning member is exposed to an original conveying section when an opened state of the original conveying section is detected.

Furthermore, according to the present invention, it is now possible to prevent damages to an original, paper jams or the like and, at the same time, suppress or prevent a reduction in the number of reads per unit time.

Further features and advantages of the present invention will become apparent from the following detailed description of exemplary embodiments with reference to the attached drawings.

DETAILED DESCRIPTION OF THE PREFERRED EMBODIMENTS

The present invention will now be described in detail with reference to the drawings showing preferred embodiments thereof.

Figure 1:
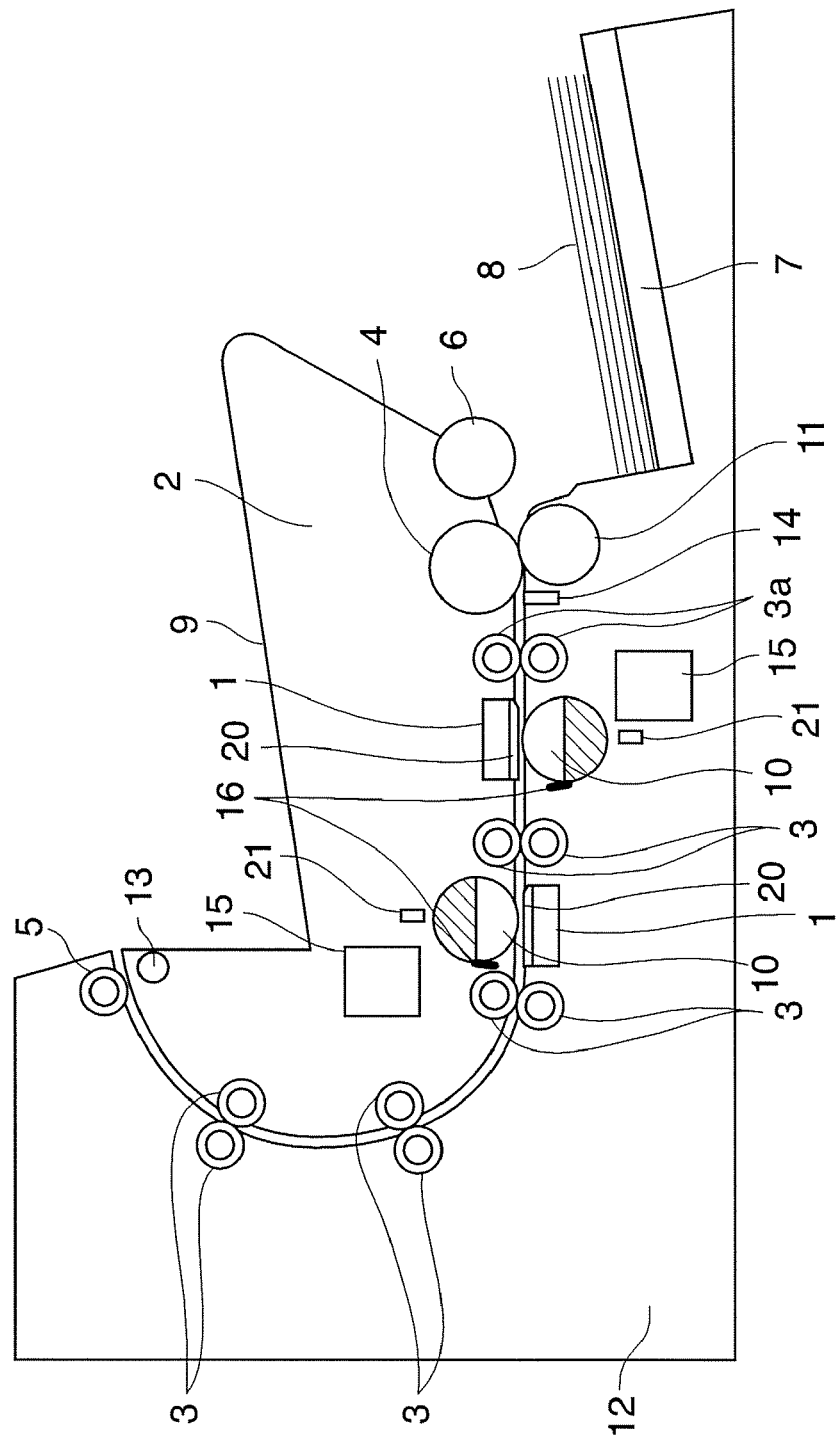
FIG. 1 is a cross-sectional diagram schematically showing a configuration of an image reading apparatus according to a first embodiment of the present invention.
Figure 2:
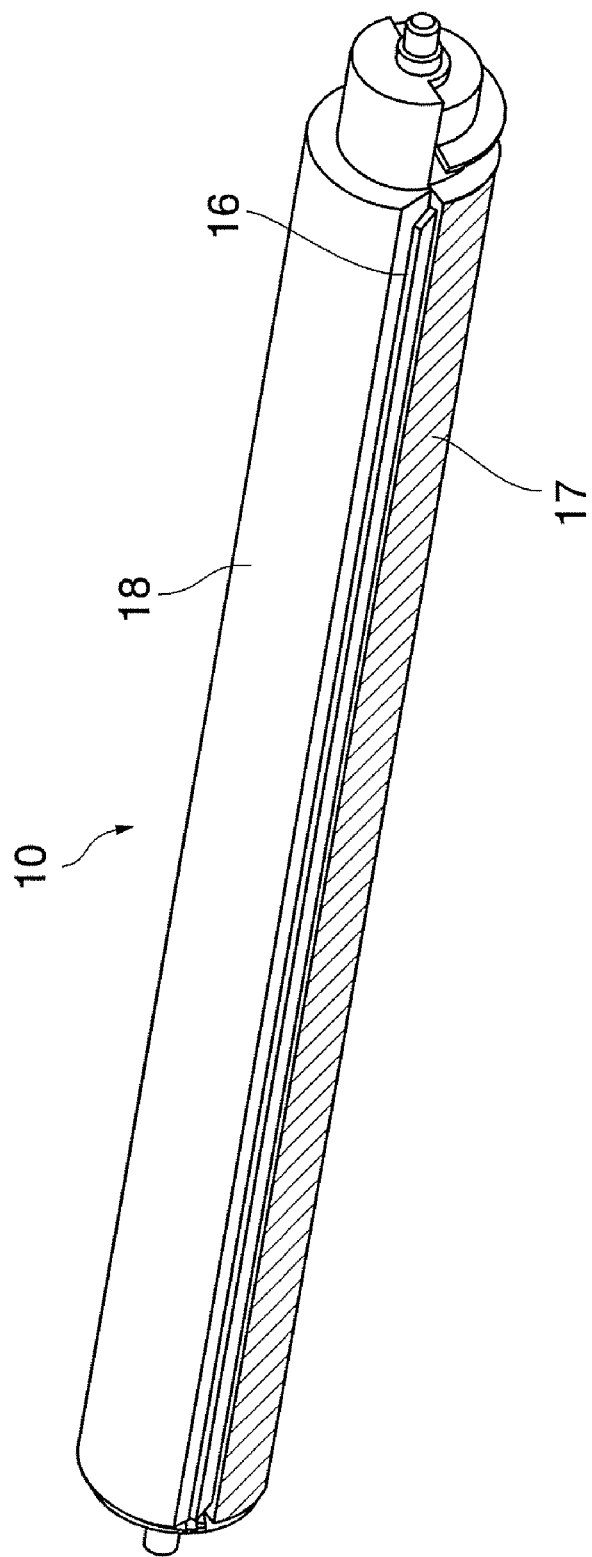
FIG. 2 is a perspective view for explaining a platen roller shown in FIG. 1.

FIG. 1 is a cross-sectional diagram schematically showing a configuration of an image reading apparatus according to a first embodiment of the present invention, and FIG. 2 is a perspective view for explaining a platen roller shown in FIG. 1.

With this image reading apparatus, as shown in FIG. 1, when an original mounting table 7 on which originals 8 are placed is elevated and an original 8 contacts a pickup roller 6, the original 8 picked up by the pickup roller 6 is fed by a feeding roller 4.

When two or more originals 8 are picked up at the same time by the pickup roller 6, the originals 8 are separated into individual sheets by a retard roller 11 and then fed. An image on the fed original 8 is read by an image sensor 1 and the read image data is transferred to an image processing section, not shown. The front end and the rear end of the fed original 8 are detected by a registration sensor 14. Conveying timing and the like are controlled by controlling the rotation and stopping of a registration roller 3a using signals from the registration sensor 14.

A platen roller 10 is provided at a position opposing the image sensor 1 with a constant clearance gap between the platen roller 10 and a contact glass 20 (refer to FIG. 3) of the image sensor 1. Although the original 8 conveyed through the clearance gap may contact the contact glass 20, it is preferable to avoid frequent contact because of contamination of the contact glass.

As shown in FIG. 2, the platen roller 10 is formed in a cylindrical shape by arranging a half-cylindrical black member 17 and a half-cylindrical white member 18 with each other in a radial direction and joining them by male and female fitting or the like. The rotational position of the platen roller 10 is detected by a platen roller position detecting sensor 21.

The platen roller 10 is normally in a stopped state. When switching the background color of the original 8, a driving motor 15 such as a stepping motor controlled by a control unit 31 (refer to FIG. 4) drives and rotates the platen roller 10.

For example, in the case of an original that is a paper having largish light transmittance and having print of rather light color, the platen roller 10 is rotated so that the white member 18 of the platen roller 10 opposes the image sensor 1 to switch the background color of the original to white in order to enhance the printed characters and the like.

In addition, in the case of double-sided printing using an original having largish light transmittance, the platen roller 10 is rotated so that the black member 17 of the platen roller 10 opposes the image sensor 1 to switch the background color of the original to black in order to reduce show-through image.

Furthermore, when performing OCR (Optical Character Recognition) processing wherein character recognition of a textual image of a read original is performed, a precise reference point is required since image data must be filed by aligning the position of read data based on a contour or edge of the original or on a reference hole.

Since an original is normally white, if the platen roller 10 disposed so as to oppose the image sensor 1 that reads an image is black, the contour, edges, holes and the like of the read original are enhanced and may be used as reference points when performing OCR processing.

In this manner, by rotating the platen roller 10, background colors of an original may be switched and selected.

An elastic member 16 extending along the axial direction of the platen roller 10 is attached so as to protrude from the outer peripheral surface of the platen roller 10 to a border portion between the black member 17 and the white member 18 of the platen roller 10 formed along the axial direction of the platen roller 10. A rubber member, a coated rubber member, a brush, a piece of fabric or the like may be used as the elastic member 16.

The rotation of the platen roller 10 causes the elastic member to contact a contact glass 20 (refer to FIG. 3) of the image sensor 1 and to clean the contact glass 20.

More specifically, driving of the platen roller 10 is started after detection of the front end of an original by the registration sensor 14. In case the rotation of the platen roller 10 is stopped at a stop position shown in FIG. 1, the control unit 31 controls the driving motor 15 so that the platen roller 10 is rotated at least approximately ¾ of a rotation to cause the cleaning member 16 to complete cleaning operation of the contact glass 20 of the image sensor 1 once before the front edge of the conveyed original reaches the clearance gap between the platen roller 10 and the image sensor 1.

After one execution of cleaning operation of the contact glass 20 by the cleaning member 16 is completed, the control unit 31 controls the driving motor 15 so that the platen roller 10 is further rotated to a rotational position where a member (the black member 17 or the white member 18) of a selected background color opposes the image sensor 1 and holds the platen roller 10 at that rotational position by a constant holding torque. The front end of the original 8 passes through the clearance gap between the platen roller 10 and the image sensor 1 during the rotation of the platen roller 10.

As shown, the control unit 31 appropriately performs controls such as securing a waiting time from the time point of detection of the front end of the original 8 by the registration sensor 14 to the time point of the start of the rotation of the platen roller 10, and adjusting the rotational speed of the platen roller 10 in order to ensure that the platen roller 10 continues its rotation after the completion of cleaning of the contact glass 20 by the cleaning member 16 when the front end of the original 8 passes through the clearance gap between the platen roller 10 and the image sensor 1.

In this case, the rotational direction of the platen roller 10 is preferably the direction in which the front end of the original 8 being conveyed is guided by the rotation.

In this manner, control of the rotation of the platen roller 10 is performed for each conveyed original to prevent adherence of contaminants on the contact glass 20 that is the reading surface of the image sensor 1, which results in ensuring of high quality image reading.

The original 8 having passed the image sensor 1 is conveyed by the conveying roller 3 and subsequently discharged to a discharge tray 9 by a discharge roller 5.

Additionally, in the above-described sequence of original conveying operations, in order to maintain an appropriate interval between the original 8 and a subsequent original, a pickup timing of the pickup roller 6 is controlled by the control unit 31 based on a detection timing at which the registration sensor 14 detects the rear end or the like of the original 8. The control is continually performed until all the originals 8 placed on the original mounting table 7 are picked up and conveyed.

After all of the originals 8 placed on the original mounting table 7 are conveyed, the original mounting table 7 is lowered and returned to its home position.

An upper unit 2 possessing the registration roller 3a, the conveying roller 3, the feeding roller 4, the image sensor 1 and the platen roller 10 is turnable via a hinge 13 with respect to the lower unit 12, and enables the conveying section to be opened and/or closed.

By performing a turning operation of the upper unit 2 with respect to the lower unit 12 and placing the conveying section in an opened state, it is now possible to clean the registration roller 3a, the conveying roller 3, the platen roller 10, the image sensor 1 and the convey path and to remove an original jammed in the convey path.

A turning operation of the upper unit 2 is detectable using an opening-closing detection sensor, not shown. Upon confirming that the upper unit 2 has returned to its normal position and the conveying section is now in a closed state, the control unit 31 performs control so that the image reading apparatus enters a feed standby mode.

Consequently, switching of background colors and cleaning of the contact glass of the image sensor 1 by the rotation of the platen roller 10 may be reliably performed without causing damage or staining of the original 8.

Figure 3A:
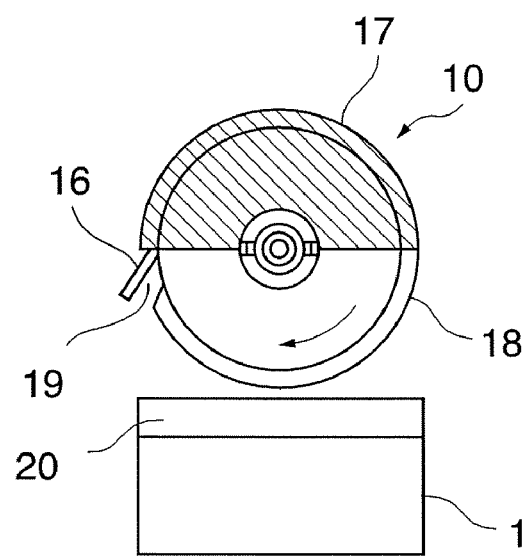
FIG. 3A is a diagram showing a state where the platen roller is stopped prior to starting a read process of an image on an original by an image sensor.

FIG. 3A is a diagram showing the platen roller 10 in a state where the platen roller 10 is stopped prior to starting a read process of an image on the original 8 by the image sensor 1.

Based on a detection by the platen roller position detecting sensor 21, the platen roller 10 is on standby state at a predetermined rotational position for example shown in FIG. 3A.

When the original 8 is conveyed and the front end of the original 8 is detected by the registration sensor 14, the control unit 31 controls the driving motor 15 to rotate the platen roller 10 so that cleaning operation of the contact glass 20 of the image sensor 1 is completed once within permitted operating time by the cleaning member 16.

Figure 3B:
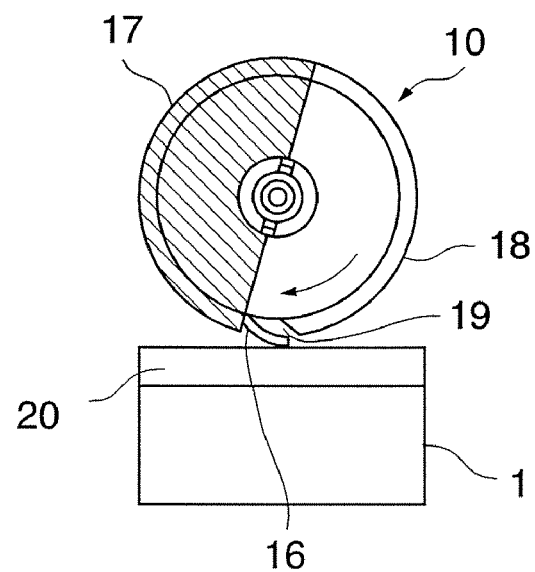
FIG. 3B is a diagram showing the platen roller in a rotating state.

FIG. 3B is a diagram showing a rotating state of the platen roller 10.

As the platen roller 10 rotates in the direction indicated by the arrow in FIG. 3B, the elastic member 16 contacts the contact glass 20 and is elastically deformed so as to fall in the direction towards the center of the platen roller 10. As a result, a portion of the elastic member 16 penetrates into an axial groove 19 formed at the mounting position of the cleaning member 16 on the outer peripheral portion of the platen roller 10.

The platen roller 10 continues rotating even after one cleaning operation of the contact glass 20 by the cleaning member 16 is completed. When white is selected as the background color, the platen roller 10 stops when once again arriving at the rotational position shown in FIG. 3A.

As described above, before the front end of the original 8 proceeds into the clearance gap between the platen roller 10 and the contact glass 20 of the image sensor 1, the control unit 31 controls the driving motor 15 so that the platen roller 10 completes cleaning operation of the contact glass 20 once by the cleaning member 16. Therefore, the front end of the original 8 which has entered the clearance gap between the platen roller 10 and the contact glass 20 of the image sensor 1 will not catch on the elastic member 16 even when the platen roller 10 continues rotating until reaching a predetermined rotational position.

Although the present embodiment is arranged so that the platen roller 10 is rotated based on a detection of the front end of each original and before reading each original to clean the contact glass 20 using the cleaning member 16, the contact glass 20 may alternatively be cleaned by the cleaning member 16 by rotating the platen roller 10 after reading the original based on a detection of the rear end of an original at a timing where the elastic member 16 does not contact the rear end of the original.

In this case, the platen roller 10 may be arranged to be rotated after waiting for the period of time necessary from the detection of the rear end of the original 8 by the registration sensor 14 until the rear end of the original 8 passes the image sensor 1.

In addition, in order to arrange the platen roller 10 to continue rotating after the cleaning operation of the contact glass 20 by the cleaning member 16 is completed at the time point where the front end of a subsequent original 8 enters the clearance gap between the platen roller 10 and the image sensor 1, the pickup and feeding of the subsequent original 8 or conveying of the same by the registration roller 3a is controlled based on the detection of the rear end of the current original 8.

The waiting time from the time point of detection of the rear end of the original 8 by the registration sensor 14 to the time point of starting rotation of the platen roller 10 and/or the permitted operating time from the aforementioned time point of detection of the front end of the original 8 by the registration sensor 14 to the time point of completing of cleaning by rotating the platen roller 10 are/is calculated by the control unit 31. The waiting times may also be arranged to be selected by the control unit 31 from a table storing predetermined set times.

In the present embodiment, while a case has been described where the platen roller 10 is stopped at a rotational position where the white member 18 opposes the image sensor 1, the platen roller 10 can be stopped at a rotational position where the black member 17 opposes the image sensor 1, and then for example the stop position is set to a rotational position where the platen roller 10 is rotated by one half rotation from the state shown in FIG. 1.

In that case the contact glass 20 is cleaned by the cleaning member 16 by rotating the platen roller 10 by at least approximately ¼ rotation before conveying the original 8. Subsequently, the rotation of the platen roller 10 is continued and stopped when one rotation is completed.

Furthermore, in the present embodiment, while a case where the contact glass 20 is cleaned by the cleaning member 16 by rotating the platen roller 10 for each conveyed original has been described, it is also possible to arrange the contact glass 20 to be cleaned by the cleaning member 16 by rotating the platen roller 10 every time two originals are conveyed or every time three originals or more are conveyed.

Moreover, cleaning may alternatively be performed by rotating the platen roller 10 at high speed to have the cleaning member 16 contact the contact glass 20 twice or more.

Figure 4:
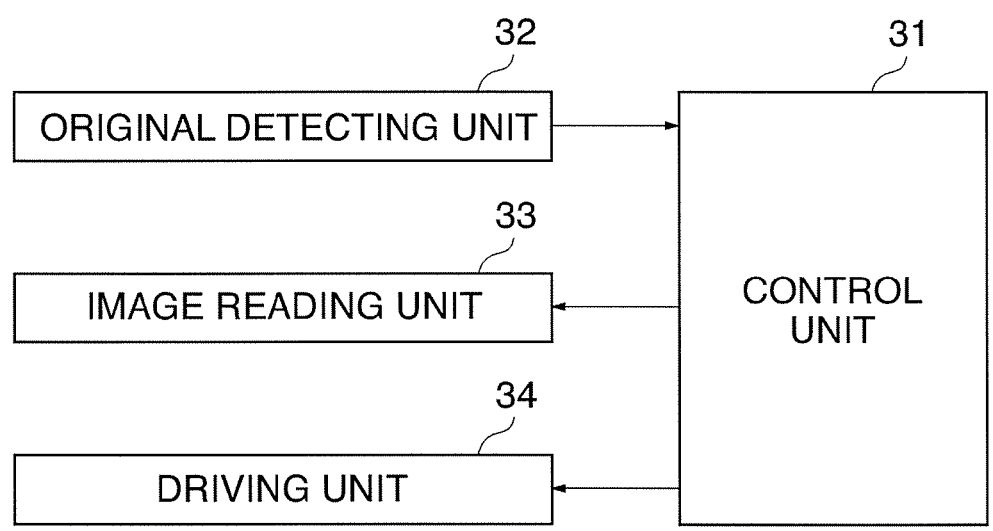
FIG. 4 is a block diagram for explaining an example of a control system for realizing a rotational movement and a stopping movement of the platen roller.

FIG. 4 is a block diagram for explaining an example of a control system for realizing a rotating operation and a stopping operation of the platen roller 10.

As shown in FIG. 4, an original detecting unit 32 detects the front end and/or the rear end of a conveyed original 8 by a signal from the registration sensor 14. An image reading unit 33 causes the image sensor 1 to read an image of the conveyed original in response to an instruction from the control unit 31. A drive unit 34 drives the driving motor 15 to rotate the platen roller 10 in response to an instruction from the control unit 31.

After the front end of the conveyed original 8 or the rear end of a preceding original is detected by the original detecting unit 32, the control unit 31 controls the driving unit 34 to rotate the platen roller 10 so that a cleaning operation by the cleaning member 16 is completed before the front end of the original 8 enters the clearance gap between the platen roller 10 and the image sensor 1.

At this point, the control unit 31 also instructs a timing for reading the image of the original 8 by the image sensor 1 to the image reading unit 33. Furthermore, the control unit 31 controls the driving unit 34 based on the detection of the front end of the original 8 so that the platen roller 10 is rotating when the front end of the original 8 passes the image sensor 1 and subsequently stops at a predetermined rotational position.

As shown, with the present embodiment, the control unit 31 controls reading of an image of the original 8 and the rotation timing of the platen roller 10 based on the detection timing of the original detecting unit 32. Due to the above-described control synchronized with the passage of the front end of the original 8 or the rear end of the preceding original, the platen roller 10 is rotating when the front end of the original 8 passes through the clearance gap between the platen roller 10 and the image sensor 1. In addition, the platen roller 10 may be arranged to be rotated until the original is nipped by the downstream-side conveying roller pair 3. In this manner, jamming of the original 8 can be prevented and the original 8 can be conveyed in a stable manner.

In the present invention, a case has been exemplified where the cleaning member is arranged to be an elastic member 16 elongatedly extending parallel to the rotational axis of the platen roller 10. However, for example, the elastic member 16 may be disposed to assume an angle with respect to a line parallel to the rotational axis of the platen roller 10 as shown in FIG. 5A or may be disposed to have a V-shaped form as shown in FIG. 5B.

Figure 5A:
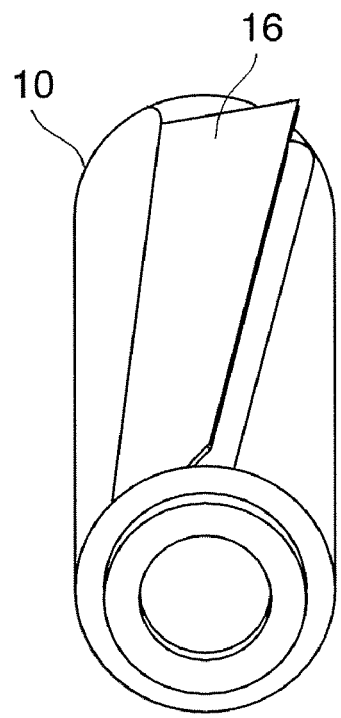
FIG. 5A is a perspective view for explaining a first modification of the cleaning member mounted on the platen roller.
Figure 5B:
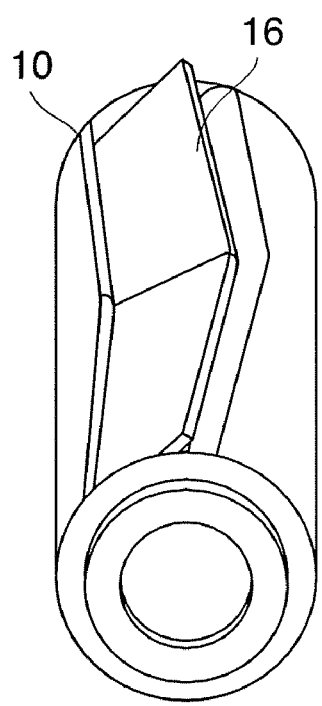
FIG. 5B is a perspective view for explaining a second modification of the cleaning member mounted on the platen roller.

As described, by disposing the elastic member 16 so as to assume an angle with respect to a line parallel to the rotational axis of the platen roller 10 as shown in FIGS. 5A and 5B, a case where the entire contact portion of the elastic member 16 which contacts the contact glass 20 simultaneously contacts the contact glass 20 will no longer occur. Consequently, the impact generated when the elastic member 16 contacts and cleans the contact glass 20 due to the rotation of the platen roller 10 can be reduced, which enables a reduction in the load torque and the sound noise of the platen roller 10 during cleaning by the cleaning member 16 can be achieved.

Figure 6A:
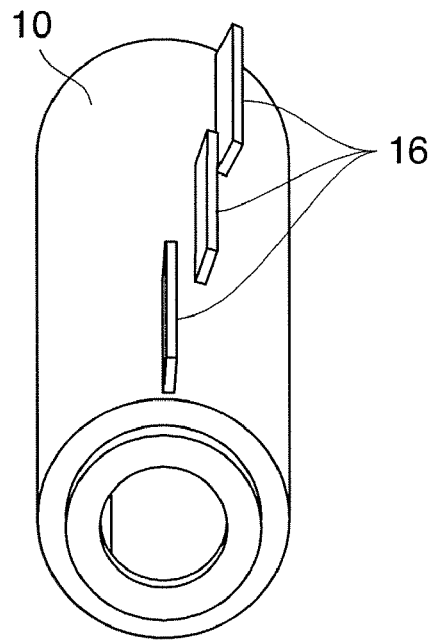
FIG. 6A is a perspective view for explaining a third modification of the cleaning member mounted on the platen roller.
Figure 6B:
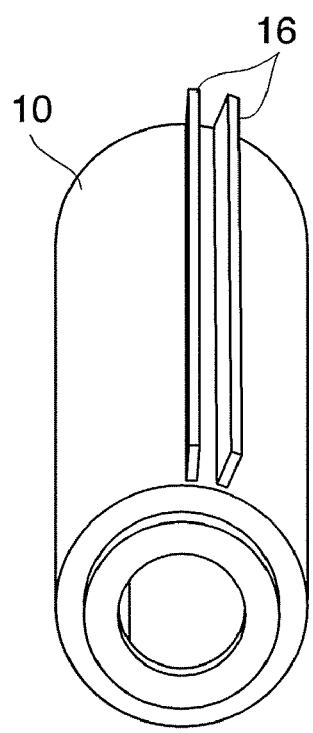
FIG. 6B is a perspective view for explaining a fourth modification of the cleaning member mounted on the platen roller.

Furthermore, in order to reduce such impact during contact, the elastic member 16 may alternatively be divided into a plurality of parts in the axial direction of the platen roller 10 where the plurality of divided parts are disposed so as not to be aligned with respect to each other in the circumferential direction as shown in FIG. 6A, or two or more rows of the elastic members 16 may alternatively be disposed so as to clean the contact glass 20 more reliably and to disperse the impact upon contact.

As described above, according to the present embodiment, based on the front end or the rear end of an original 8 detected by the registration sensor 14, the platen roller 10 is rotated before or after image reading for each conveyed original 8.

Consequently, contaminants adhered to the contact glass of the image sensor 1 during conveying of the original 8 can be reliably cleaned by the elastic member 16 to enable high quality image reading.

In addition, even if contaminant adhere to the contact glass 20 during image reading, since the platen roller 10 is rotated and the contact glass 20 is cleaned by the elastic member 16 before the next conveyed original 8 arrives at the platen roller 10, occurrences of streaks in the read image of the original 8 to be conveyed next can be prevented.

An image reading apparatus according to a second embodiment of the present invention will now be described with reference to FIGS. 7 to 9. An image reading apparatus according to the second embodiment has fundamentally the same construction as the first embodiment described above, and therefore corresponding elements are designated by identical reference numerals and description thereof is omitted.

With the first embodiment described above, the platen roller 10 rotates to clean the contact glass 20 with the cleaning member 16 before the front end of an original 8 passes through the clearance gap between the platen roller 10 and the contact glass 20 of the image sensor 1, and the platen roller 10 continues rotating to a predetermined rotational position when the front end of the original 8 passes through the clearance gap between the platen roller 10 and the contact glass 20 of the image sensor 1.

However, since there is no relation between the conveying speed of the original 8 and the rotational speed of the platen roller 10, with an worn-out original with a folded front end or the like, there may be cases where the front end of the original becomes jammed in the clearance gap between the platen roller 10 and the image sensor 1. In addition, with a soft and thin original, there may be cases where the front end of the original collides with the platen roller 10 and causes a paper jam.

In consideration thereof, in the present embodiment, an example will be described where the rotation timing and the rotational speed of the platen roller 10 are controlled so as to prevent the front end of an original 8 from jamming in the clearance gap between the platen roller 10 and the contact glass 20 of the image sensor 1.

Figure 7:
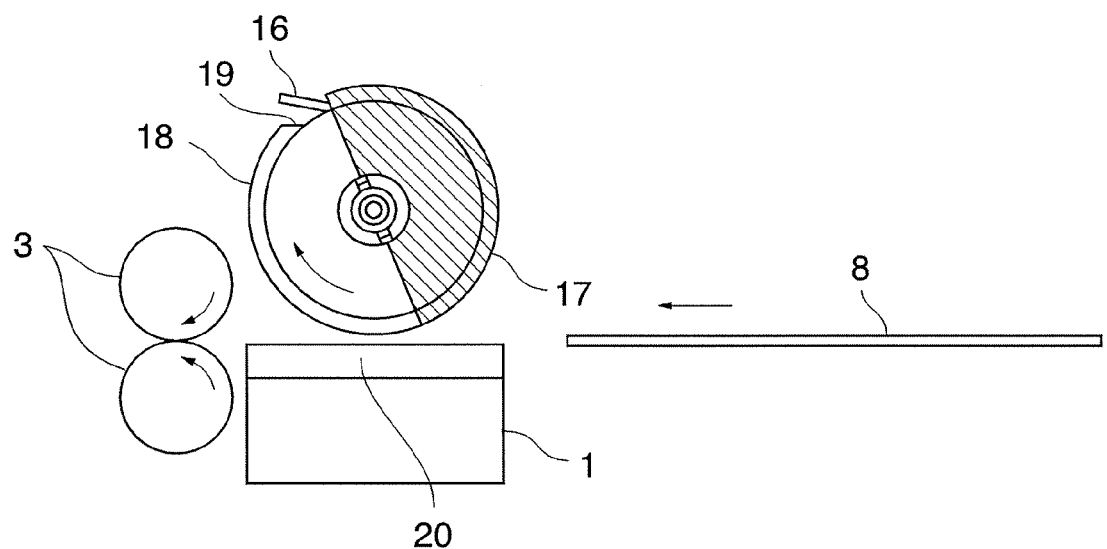
FIG. 7 is a diagram showing a state where a platen roller on standby begins rotating based on the detection of a front end of an original by a registration sensor in an image reading apparatus according to a second embodiment of the present invention.

FIG. 7 is a diagram showing a state where the control unit 31 controls the driving unit 34 based on the detection of the front end of an original 8 by the registration sensor 14 and the platen roller 10 on standby has begun to rotate in the direction indicated by an arrow shown in the diagram.

The platen roller 10 rotates while being accelerated or decelerated until a circumferential speed approximately equal to the conveying speed of the original 8 is reached, and until that time a cleaning operation of the contact glass 20 had been performed by the cleaning member 16. Varying in the rotational speed (third rotational speed) of the platen roller 10 until a rotational speed approximately equal to the conveying speed of the original 8 is reached is arbitrary. In other words, the platen roller 10 may be decelerated after initially reaching a circumferential speed significantly greater than the conveying speed.

Figure 8:
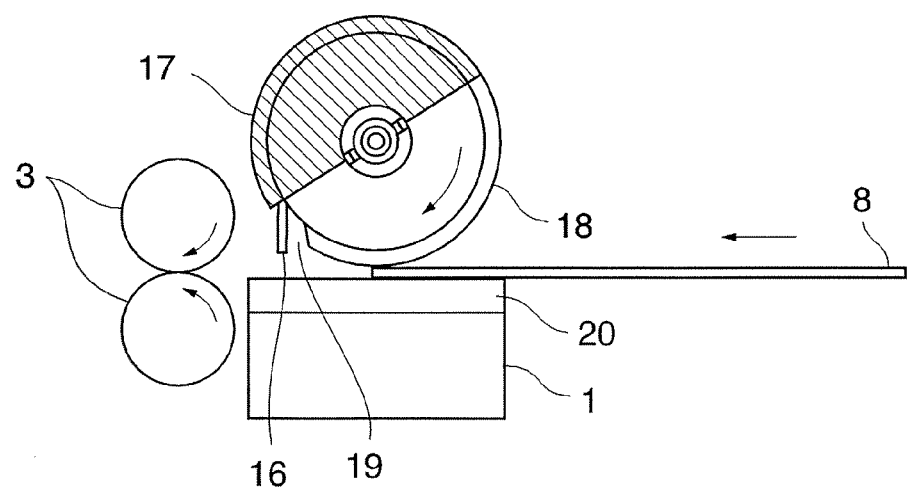
FIG. 8 is a diagram showing a state where a front end of an original is entered a clearance gap between the platen roller and an image sensor.

FIG. 8 is a diagram showing a state where the front end of an original 8 has entered the clearance gap between the platen roller 10 and the contact glass 20 of the image sensor 1.

At this point, the control unit 31 controls the driving unit 34 so that the platen roller 10 is at a rotational speed (first rotational speed) that is approximately the same as or greater than the conveying speed of the original 8.

Figure 9:
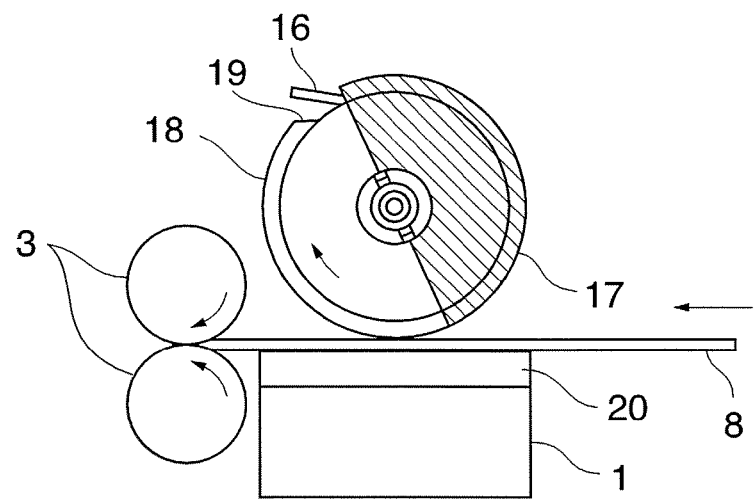
FIG. 9 is a diagram showing a state where a front end of an original is nipped by a downstream-side conveying roller pair to be conveyed at approximately the same time or before or after a rotating platen roller assumes a rotation-stopped state (second rotational speed).

FIG. 9 is a diagram showing a state where the front end of an original 8 is nipped by the conveying roller pair 3 disposed downstream of the image sensor 1 to be conveyed at approximately the same time or before/after the rotating platen roller 10 assumes a rotation-stopped state (second rotational speed).

When an image on the original 8 is being read by the image sensor 1, for example the white member 18 of the platen roller 10 is opposed to the image sensor 1 and the background color included in the read image will not be switched. The above-described rotational operation and stopping operation of the platen roller 10 are repeated for each conveyed original.

Instead of a rotation-stopped state of the platen roller 10, the second rotational speed may be arranged as a rotational speed sufficiently low such that the background color of the original 8 is prevented from being switched from the white member 18 to the black member 17 during reading of a single image.

In case of changing the background color of the original 8 to black, a state that the platen roller 10 is half-rotated from the state shown in FIG. 7 is set as the standby position of the platen roller 10, and the control unit 31 controls the driving unit 34 so that the same rotational movement as described above is performed to clean the contact glass 20 with the cleaning member 16 before the original 8 is conveyed or after the preceding original is conveyed and the platen roller 10 is rotated so as to enable the front end of the original 8 to readily pass through the clearance gap between the platen roller 10 and the contact glass 20 of the image sensor 1.

As described above, in the present embodiment, the platen roller 10 is rotated for a predetermined number of rotations at a rotational speed approximately equal to or greater than the conveying speed of the original 8 from immediately before the front end of the original 8 passes the image sensor 1.

Consequently, the front end of the original 8 is now able to pass through the clearance gap between the platen roller 10 and the contact glass 20 of the image sensor 1 in an easier manner, and even in the case of an original having a folded front end or an original that is soft and thin, the original 8 can be stably conveyed without the front end thereof jamming in the clearance gap.

In addition, since stopping of the platen roller 10 which is necessary during image reading is performed after a predetermined time period, the platen roller 10 will continue rotating until the front end of the original 8 is nipped by the conveying roller pair 3 disposed downstream of the platen roller 10 and conveying of the original 8 is stabilized. Therefore, conveying of the original 8 can be performed more reliably. Other configurations, operations and advantages are the same as the first embodiment described above.

It is to be understood that the present invention is not limited to the respective exemplary embodiments described above and that various modifications may be made without departing from the scope of the following claims.

For example, while the platen roller is arranged to have two colors in the respective embodiments described above, the present invention is not limited to this arrangement. Alternatively, the present invention may be applied to a platen roller with one color or a platen roller with three or more colors. In addition, rotating members such as the platen roller may be replaced with swinging members that perform a reciprocating swing motion. For example, the cleaning member may be provided on a half cylindrical surface of a half-cylindrical rotating member. Furthermore, while the respective embodiments described above are arranged so that the contact glass 20 is cleaned by the elastic member 16 based on a detection of the front end or the rear end of an original 8 by the registration sensor 14, such cleaning may alternatively be based on a detection of both the front end and the rear end of the original 8. The present invention may also be arranged so that a contact member is vibrated using a vibrator that vibrates the contact member to shake off contaminants such as paper dust adhering to the surface of the contact member. In this case, although contaminants can be removed even during a read operation, when the reading resolution is high and vibrating is discouraged, the vibrator is desirably controlled so as to vibrate the contact member after the original has passed an image reading position of the image sensor and before a next original reaches the image reading position. Moreover, the white portion of the platen roller may be used as a white reference member for acquiring shading correction data. When acquiring shading correction data, the rotational position of the platen roller is controlled so that the white portion of the platen roller assumes a position opposing the image sensor 1.

Figure 10:
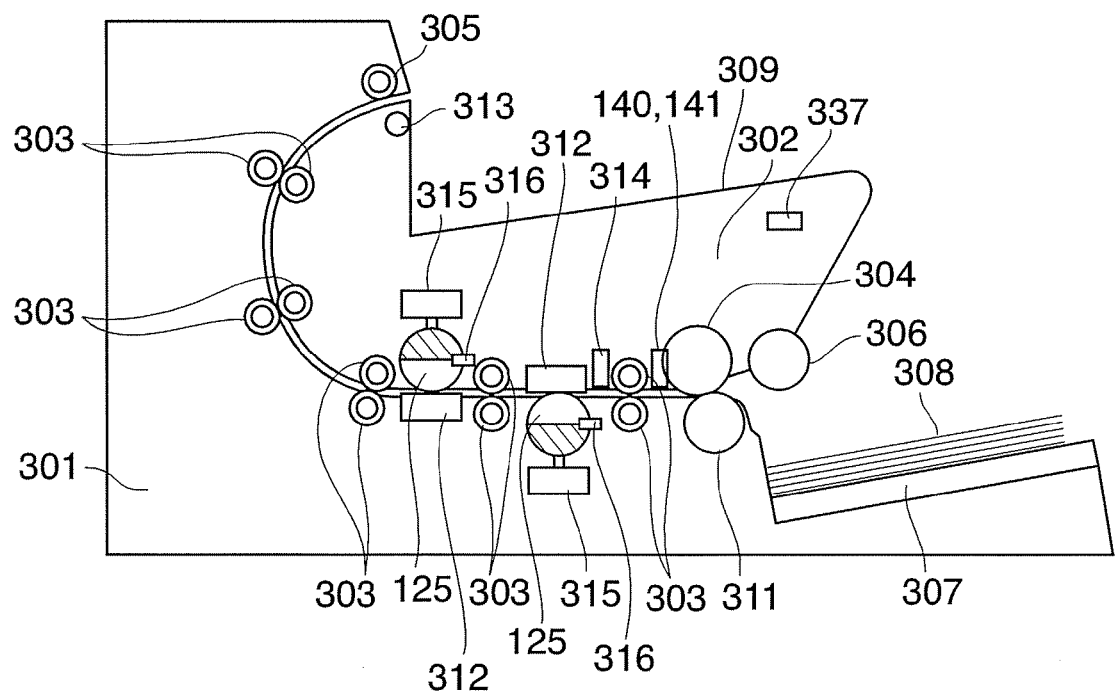
FIG. 10 is a cross-sectional diagram schematically showing a configuration of an image reading apparatus according to a third embodiment of the present invention.
Figure 30:
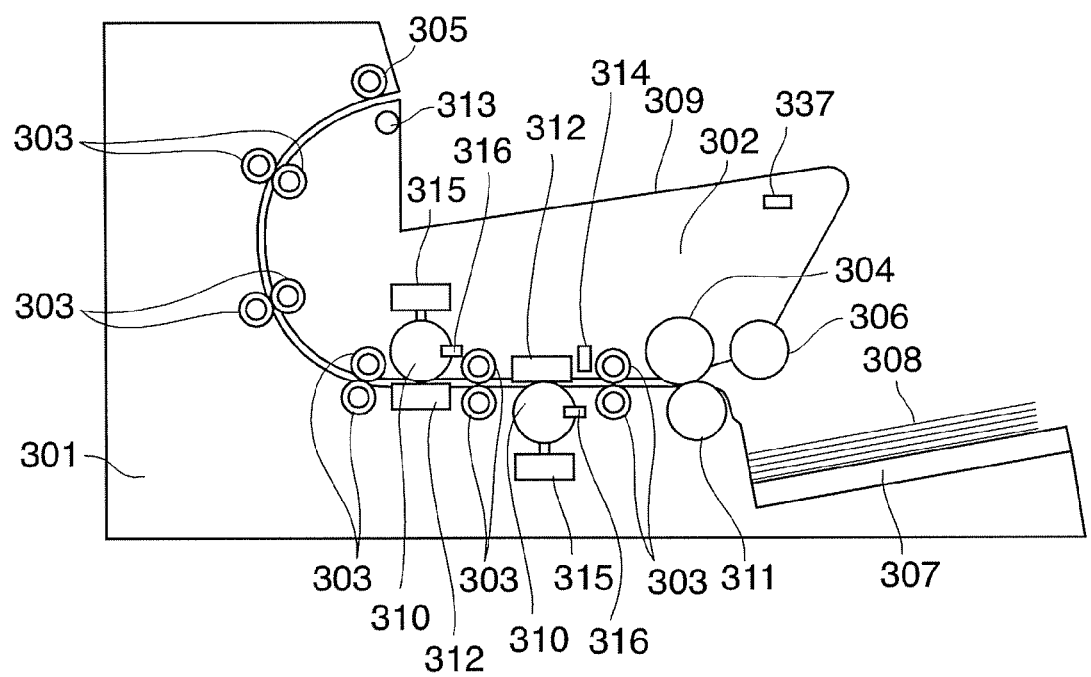
FIG. 30 is a cross-sectional diagram schematically showing a configuration of a conventional image reading apparatus.

FIG. 10 is a cross-sectional diagram schematically showing a configuration of an image reading apparatus according to a third embodiment of the present invention. Since the basic configuration of the image reading apparatus according to the present embodiment is approximately the same as the conventional image reading apparatus already described with reference to FIG. 30, portions overlapping with or corresponding to the image reading apparatus shown in FIG. 30 will be assigned like reference characters and a description thereof will either be omitted or simplified.

As shown in FIG. 10, in the image reading apparatus according to the present embodiment, skew detection sensors 140 and 141 are disposed upstream of the registration sensor 314, and a platen roller 125 is used instead of the conventional platen roller 310.

Figure 12:
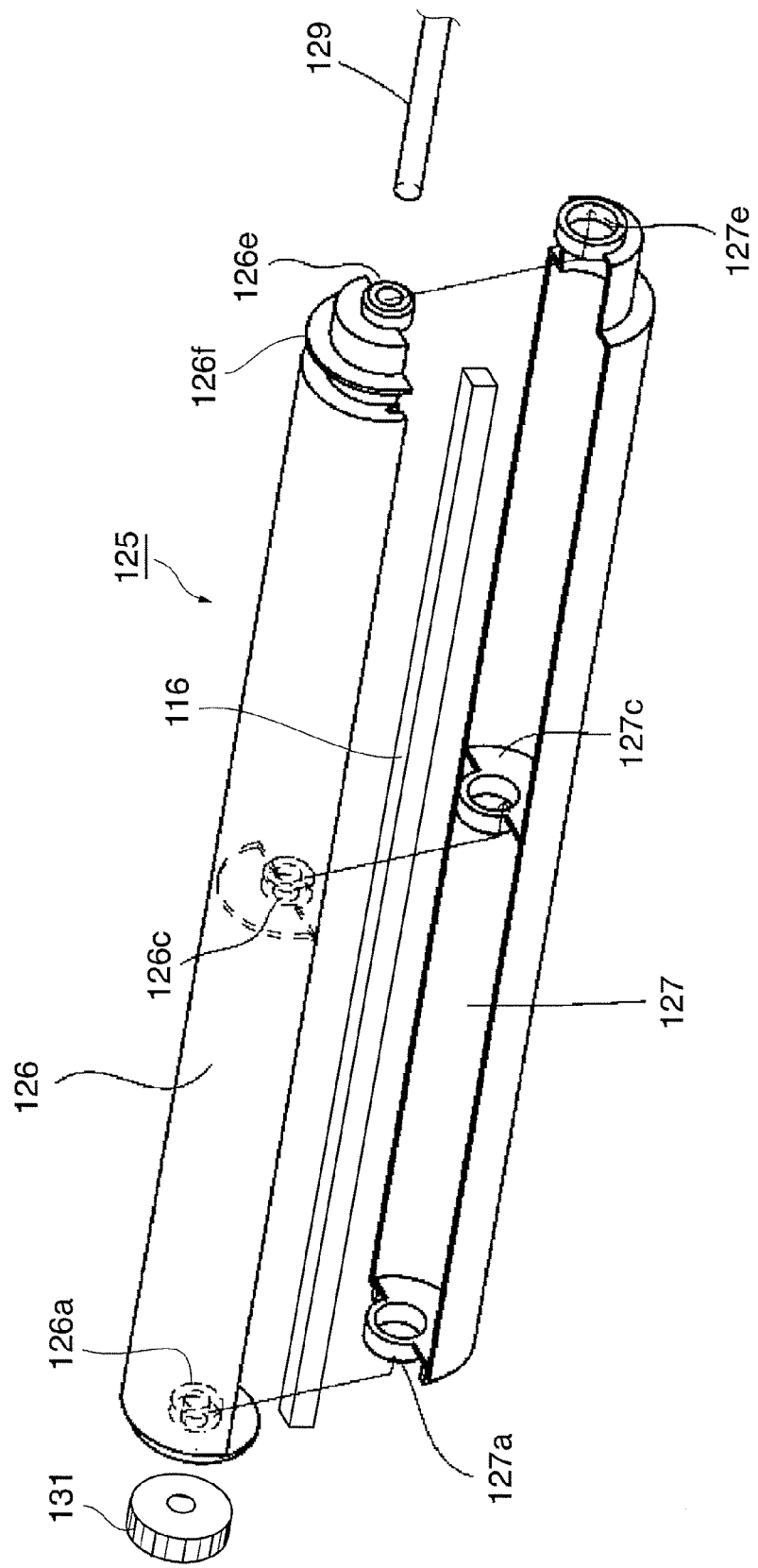
FIG. 12 is an exploded perspective view showing a configuration of a platen roller.

Describing now the platen roller 125 with reference to FIG. 12, the platen roller 125 includes a half-cylindrical black member 126, a half-cylindrical white member 127 and a cleaning member 116 that cleans a reading surface of an image sensor 312.

Both axial end portions and the axial center portion of the black member 126 are coaxially provided with, for example, cylindrical fitted portions 126a, and 126e respectively protruding in a same axial direction and a fitted portion 126c. In addition, a half disk-shaped light intercepting portion 126f for detecting a rotational position of the platen roller 125 is provided in the vicinity of the fitted portion 126e of the black member 126. The light intercepting portion 126f is not limited to any particular shape or size.

Due to the rotation of the platen roller 125, the light intercepting portion 126f intercepts incident light to a light receiving portion of a platen roller rotational position detecting sensor 135 (refer to FIG. 16) constituted by a photointerrupter or the like. The light intercepting portion 126f is formed integrally formed with the black member 126. This eliminates the need to separately provide a member for intercepting incident light to the light receiving portion of the platen roller rotational position detecting sensor 135. As a result, a simpler structure as well as a reduction in cost may be achieved.

In the case where the light transmission rate of the white member 127 is low, it is also possible to form a light intercepting portion integrally formed with the white member 127 using the same plastic or the like.

Both axial end portions and the axial center portion of the white member 127 are coaxially provided with, for example, cylindrical receiving portions 127a and 127e and a receiving portion 127c into which the fitted portions 126a and 126e and the fitted portion 126c are respectively axially fitted.

In order to combine the black member 126 and the white member 127, first, the black member 126 and the white member 127 are matched in a radial direction in a state where the fitted portions 126a and 126e and the fitted portion 126c of the black member 126 are displaced towards one axial end side (the left-hand side in FIG. 12) with respect to the receiving portions 127a and 127e and the receiving portion 127c of the white member 127. At this point, a cleaning member 116 is interposed between joint portions on one side among joint portions of the black member 126 and the white member 127 on both sides thereof along the axial direction.

Next, by relatively sliding the black member 126 towards the other axial end side (the right-hand side in FIG. 12) with respect to the white member 127, the fitted portions 126a and 126e and the fitted portion 126c of the black member 126 are moved in the axial direction and are fitted into the receiving portions 127a and 127e and the receiving portion 127c of the white member 127.

Consequently, the black member 126 and the white member 127 are combined and, at the same time, the cleaning member 116 is mounted between the black member 126 and the white member 127 so as to protrude therefrom. After combining the black member 126 and the white member 127 in this manner, separation of the black member 126 from the white member 127 is prevented using a snap-fit portion or the like, not shown.

Subsequently, by inserting a shaft 129 into an inner circumferential portion of the fitted portions 126a, 126c and 126e of the black member 126, a cylindrical platen roller 125 with the shaft 129 protruding from both axial ends thereof is formed. The male and female fitting structure of the black member 126 and the white member 127 are not limited to any particular structure and various male and female fitting structures can be employed.

Figure 11:
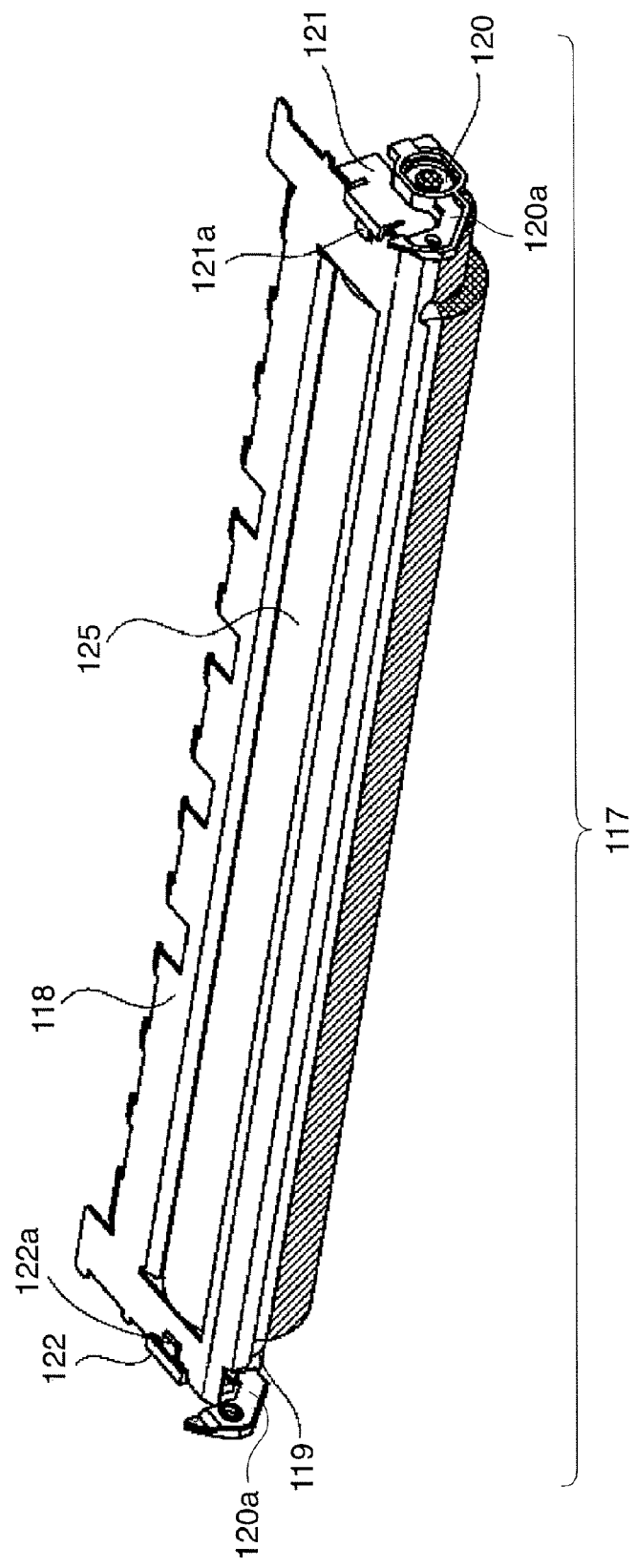
FIG. 11 is a perspective view showing a configuration of a platen roller assembly.

FIG. 11 is a perspective view showing a configuration of a platen roller assembly 117 comprising the platen roller 125, holding members 121 and 122, and a convey guide 118.

In FIG. 11, the holding members 121 and 122 hold the convey guide 118 that guides a conveyed original 308 and also holds the shaft 129 protruding from both axial ends of the platen roller 125 so as to be rotatable via shaft bearing portions 119 and 120.

A predetermined clearance gap between the platen roller 125 and the image sensor 112 is secured by having the image sensor 112 abut spacer portions 121a and 122a of the holding members 121 and 122 when the conveying section returns the closed state after the platen roller assembly 117 is mounted to the apparatus main unit.

Figure 13:
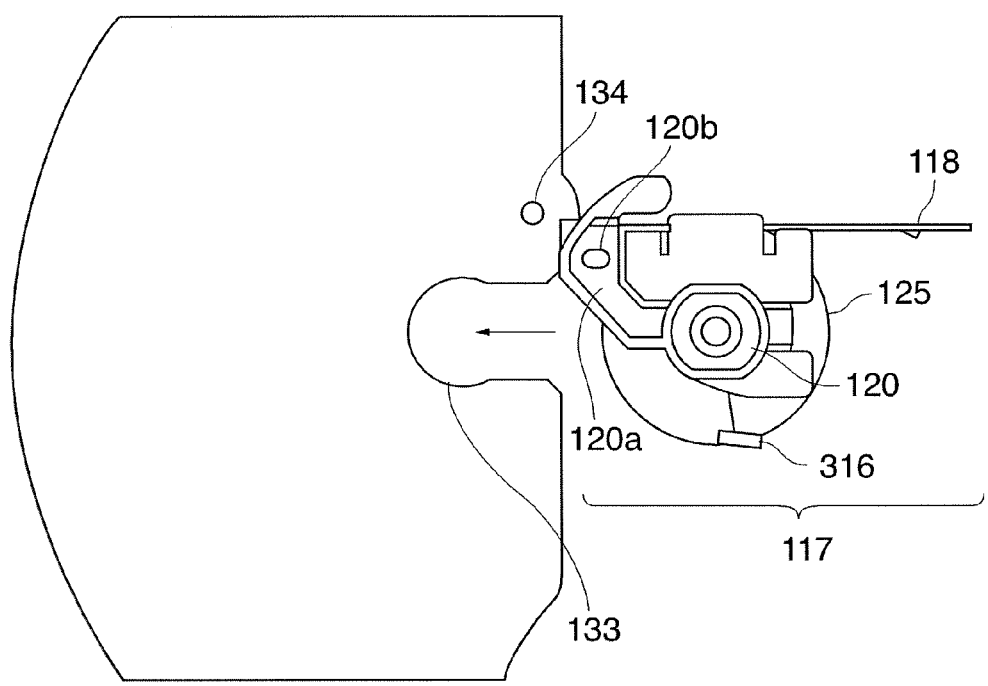
FIG. 13 is a diagram for explaining a mounting method of the platen roller assembly.

FIG. 13 is a diagram for explaining a mounting method of the platen roller assembly 117.

In order to mount the platen roller assembly 117 to the apparatus main body, first, an upper unit 302 is turned with respect to a lower unit 301 to set the conveying section to an opened state. As shown in FIG. 13, mounting portions 133 notched in an approximately U-shape are provided on both width-direction side walls of the upper unit 302 perpendicular to the conveying direction of the original 308.

The shaft bearing portions 119 and 120 are inserted into the respective mounting portions 133 of the upper unit 302 in a state of the platen roller assembly 117 where the convey guide 118 is disposed above and an axis line of the platen roller 125 is arranged in a width direction of the upper unit 302.

In this state, the platen roller assembly 117 is mounted to the upper unit 302 by rotating the platen roller assembly 117 around the axis line of the platen roller 125.

More specifically, as shown in FIG. 13, protrusions 134 are provided above the mounting portions 133 of the upper unit 302, and arm portions 120a are respectively fixed to the shaft bearing portions 119 and 120 provided on the holding members 121 and 122 of the platen roller assembly 117.

The arm portions 120a are formed by elastic members and are provided with locking portions 120b to be attachably/detachably locked to the protrusions 134 of the upper unit 302.

Figure 14:
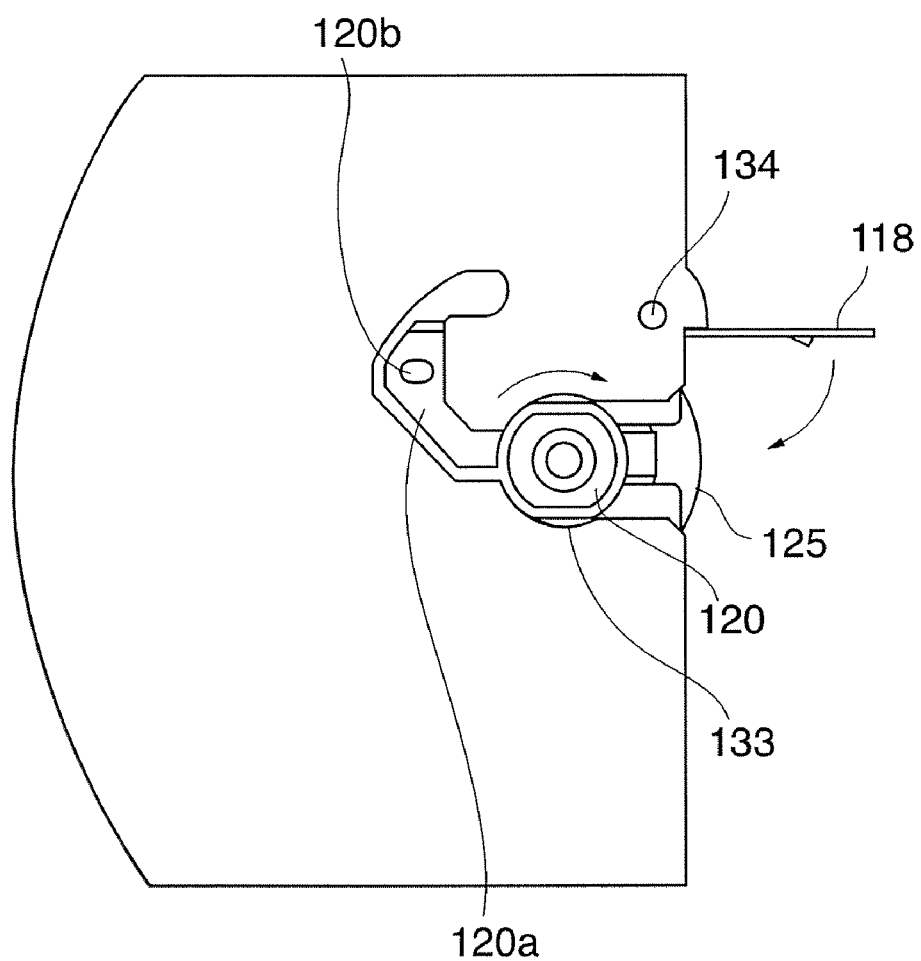
FIG. 14 is a diagram for explaining a mounting method of the platen roller assembly.
Figure 15:
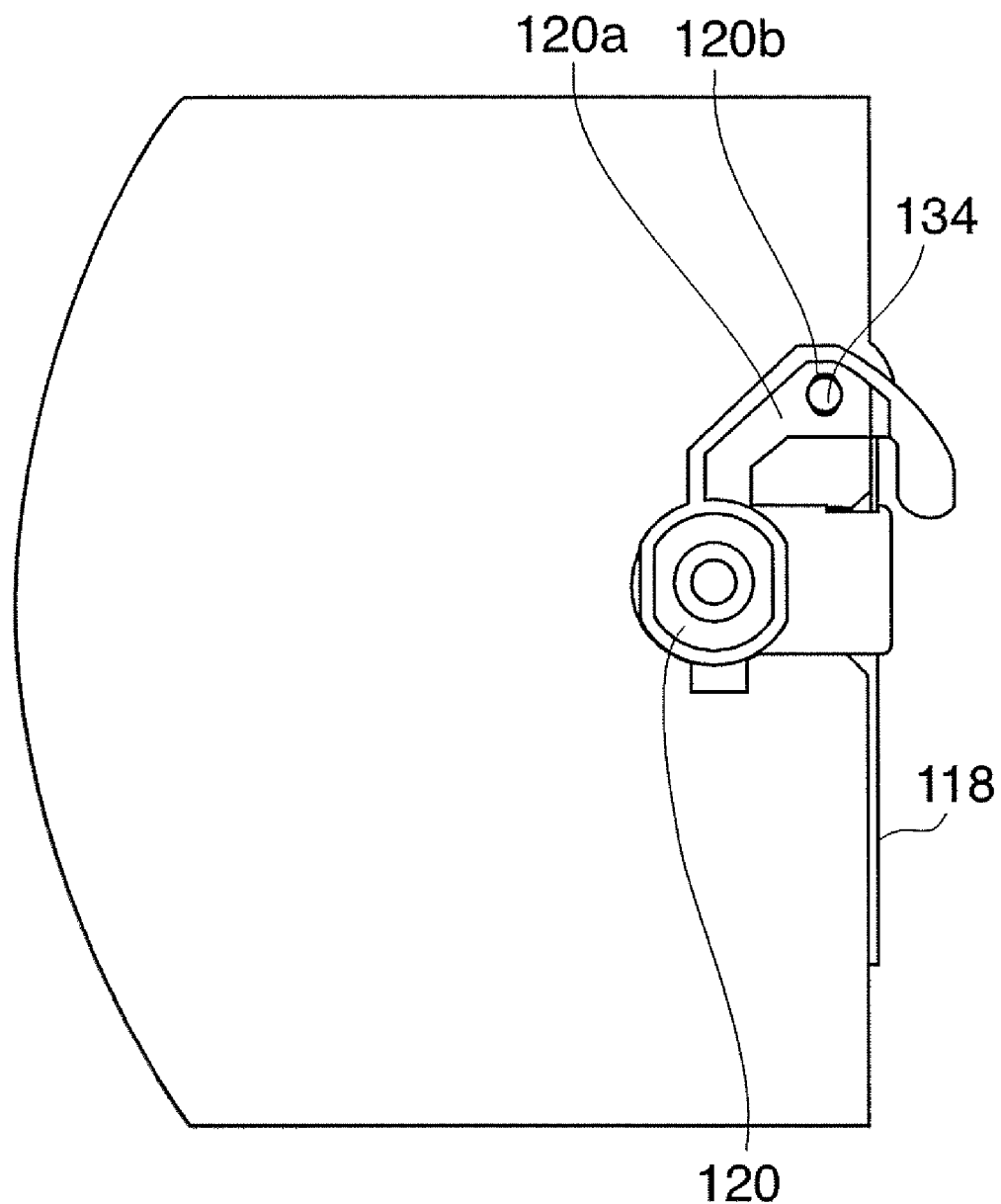
FIG. 15 is a diagram for explaining a mounting method of the platen roller assembly.

Next, as shown in FIGS. 14 and 15, in a state where the convey guide 118 is disposed above, the shaft bearing portions 119 and 120 of the platen roller assembly 117 are inserted into and struck against the mounting portions 133 of the upper unit 302 (refer to FIG. 14).

In this state, by rotating the platen roller assembly 117 around the axis of the platen roller 125 by 90 degrees (in the direction indicated by the arrow in FIG. 14), the arms 120a bend and climb over the protrusions 134 and the locking portions 120b are locked by the protrusions 134 (refer to FIG. 15). Accordingly, the platen roller assembly 117 can be readily mounted to the upper unit 302.

On the other hand, when detaching the platen roller assembly 117 from the upper unit 302, after bending the arms 120a and unlocking the locking portions 120b from the protrusions 134, the above-described mounting process is performed in reverse. In this manner, the platen roller assembly 117 can be readily detached from the upper unit 302. Besides the upper unit 302, the platen roller assembly 117 can also be attachably/detachably mounted to the lower unit 301 in the same manner as described above.

Figure 16:
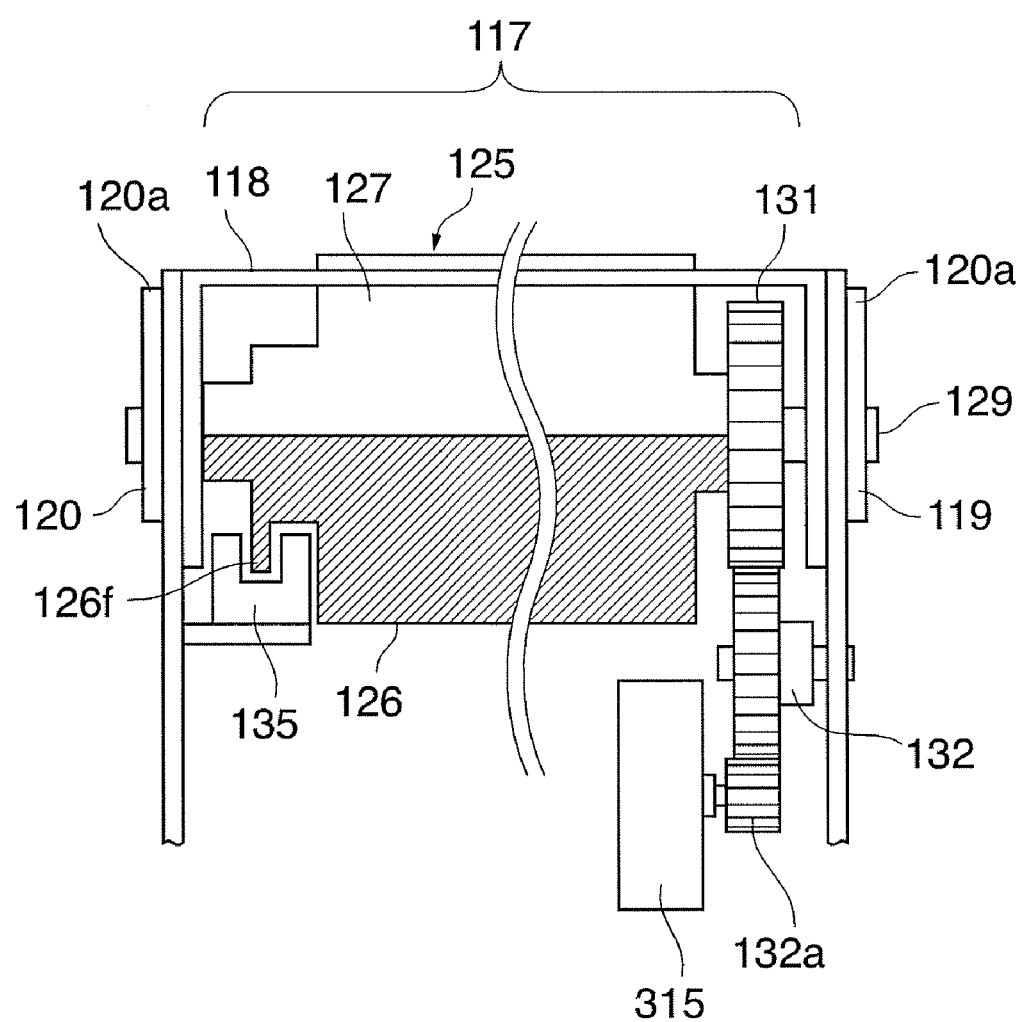
FIG. 16 is a diagram showing a state where the platen roller assembly is mounted to an apparatus main body.

FIG. 16 is a diagram showing a state where the platen roller assembly 117 is mounted to the apparatus main body. When the platen roller assembly 117 is mounted to the apparatus main body, a gear 132 on the apparatus main body side meshes with a gear 131 fixed on the shaft 129 protruding from the end portion of the platen roller 125 on the opposite side of the light intercepting portion 126f, and a gear 132a fixed on a motor shaft of a platen roller driving motor 315 meshes with the gear 132. Therefore, the platen roller 125 is rotationally driven by the platen roller driving motor 315.

Consequently, the light intercepting portion 126f formed on the platen roller 125 is now able to proceed to a position where incident light to the light receiving portion of the platen roller position detecting sensor 135 can be intercepted, and a control circuit 900 (refer to FIG. 18) becomes capable of recognizing the rotational position of the platen roller 125 and controlling the rotational movement of the same.

In other words, the control circuit 900 detects the rotational position of the platen roller 125 based on a time point where the light intercepting portion 126f mounted on the platen roller 125 causes a variation in the output of the platen roller position detecting sensor 135. Subsequently, the platen roller 125 can be rotated to an arbitrary position by driving the platen roller driving motor 315 by a desired amount.

Figure 18:
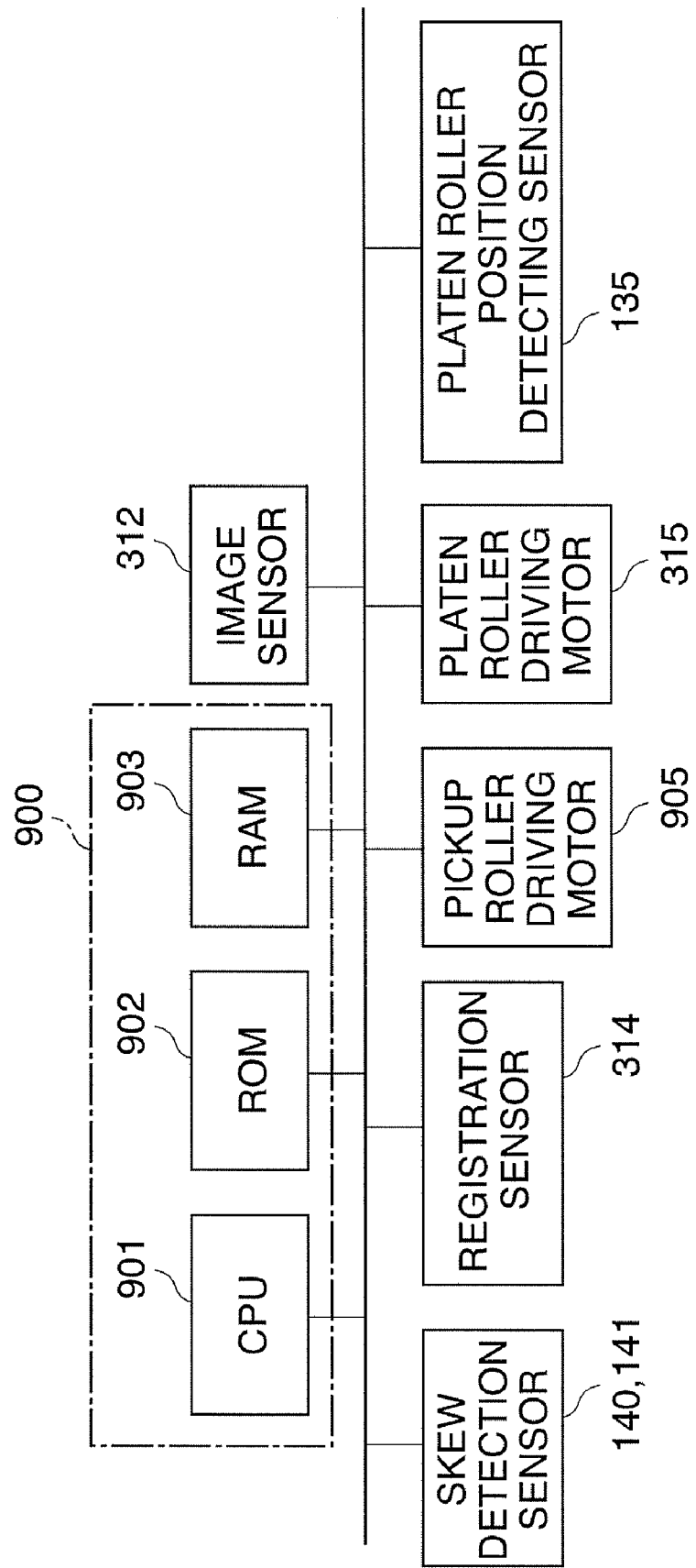
FIG. 18 is a block diagram schematically showing a configuration of a control system of the image reading apparatus.

FIG. 18 is a schematic block diagram of a control system of the image reading apparatus shown in FIG. 10. The control circuit 900 in FIG. 18 includes a CPU 901 that controls the entire apparatus, a ROM 902 storing control programs and data, and a RAM 903 which records data that controls programs and image data.

Connected to the control circuit 900 are skew detection sensors 140 and 141 which detect a skew of an original, the registration sensor 314 which detects the front and rear ends of an original, and the platen roller position detecting sensor 135 which detects the rotational position of the platen roller 125.

Also connected to the control circuit 900 are the image sensor 312 which reads images on a conveyed original 308, a pickup roller driving motor 905 which drives the pickup roller 306, and the platen roller driving motor 315 which drives the platen roller 125.

Next, a calculation example of a skew amount of the rear end of an original 308 by the control circuit 900 will be described with reference to FIG. 17. While the skew amount is calculated as a delay time in the case where the passage of the rear end of a skewed original is delayed by the skew, the present invention is not limited to this arrangement and the skew amount may alternatively be calculated as an angle, a distance or the like.

First, the skew detection sensors 140 and 141, which are both optical reflective sensors and detect a skew of the rear end of the original 308, are disposed on the upstream-side of the registration sensor 314 provided at a center portion in the width direction of the convey path.

The skew detection sensor 140 is disposed so as to be spaced to one side (the left-hand side in FIG. 17) in the width direction of the original 308 with respect to the registration sensor 314, and the skew detection sensor 141 is disposed so as to be spaced to the other side (the right-hand side in FIG. 17) in the width direction of the original 308 with respect to the registration sensor 314. The spacings of the skew detection sensors 140 and 141 from the registration sensor 314 is arranged to be the same.

Figure 17:
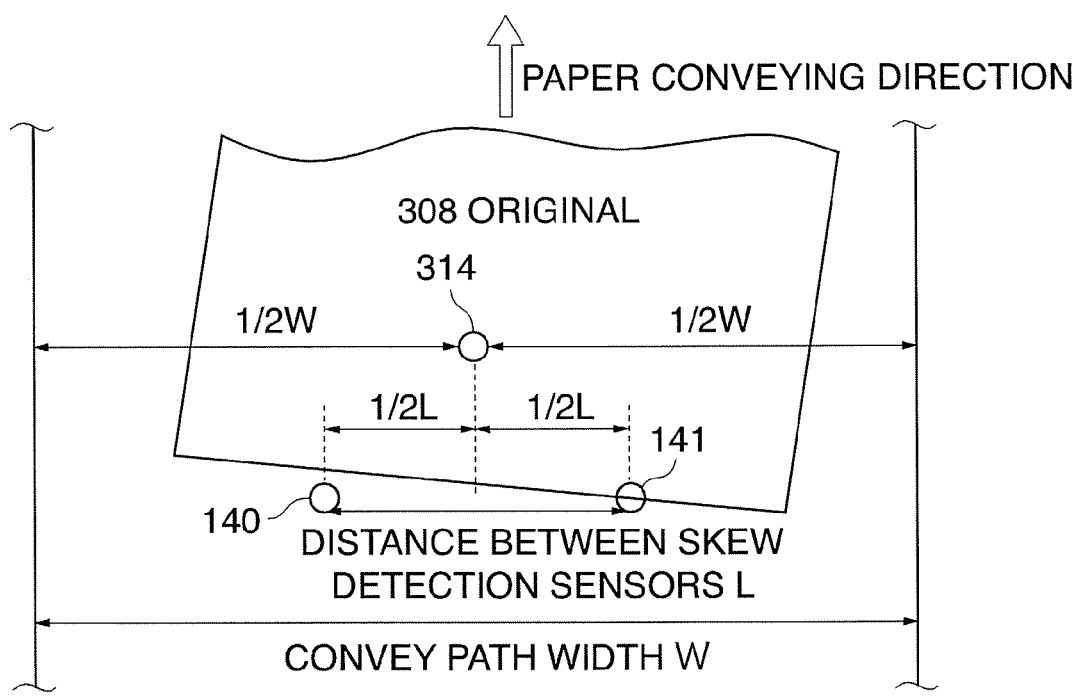
FIG. 17 is a diagram for explaining a calculation example of a skew amount of a rear end of an original by a control circuit.

As shown in FIG. 17, when the original 308 skews, one skew detection sensor 140 first detects the rear end of the original 308. Next, as the original 308 is conveyed, the other skew detection sensor 141 detects the rear end of the original 308.

At this point, if: L denotes the distance between the skew detection sensors 140 and 141; T denotes a difference in the detection times of the skew detection sensors 140 and 141; W denotes the width of the convey path; and T' denotes a time elapsed from the time point where the rear end of an original of maximum width or, in other words, an original whose width is the same as the width of the convey path is detected by the registration sensor 314 to the time point where a corner portion of the rear end of the tilted and delayed original reaches the same position as the registration sensor 314 with respect to the convey direction, the relationship represented by $L:ST=W/2:ST'$ is true. From this relationship, $T'=(T \times W)/(2L)$ is derived.

In other words, the control circuit 900 calculates the above-mentioned time T', and when a time represented by T'+ (the distance between the registration sensor 314 and the platen roller 125/S) has elapsed from the time point where the rear end of the original 308 is detected by the registration sensor 314, the control circuit 900 controls the platen roller driving motor 315 so that: the platen roller 125 is rotated to cause the cleaning member 316 mounted on the platen roller 125 to clean the reading surface of the image sensor 312; the platen roller 125 is stopped at a position where a member of a preset background color (the white member 127 or the black member 126) opposes the image sensor 312; and the stopped state is subsequently maintained. The rotation of the platen roller 125 may be started earlier than described above in consideration of the delay time between the time point where the rotation of the platen roller 125 starts and the time point where the cleaning member 316 actually performs cleaning.

In addition, at this point, the control circuit 900 controls the pickup roller driving motor 905 to adjust the pickup timing by the pickup roller 306 so that the next original does not reach the platen roller 125. With an image reading apparatus not provided with a pickup roller, since a feeding roller also functions as a pickup roller, similar operations can be realized by adjusting the feed start timing of the feeding roller. Under such control, the two originals described above are simultaneously conveyed so that an original interval that is the distance from the rear end of the original currently being read to the front end of the next original is normally a predetermined original interval, for example, 100 mm. The timing at which the platen roller is rotated to clean the reading surface of the image sensor and the timing at which the next original is picked up are delayed according to a detected skew amount between the time point where the rear end of the abovementioned original has passed the image reading position and the time point where the front end of the next original reaches the image reading position.

As described above, according to the present embodiment, by detecting a skew of the rear end of the original 308, a cleaning operation of the reading surface of the image sensor 312 by the cleaning member 316, a rotational movement of the platen roller 125 which stops the same at a rotational position where a member of a preset background color (the white member 127 or the black member 126) opposes the image sensor 312, and a pickup operation of the next original can be started at timings delayed according to the skew amount.

Consequently, damage and jamming of an original can be prevented and the delays of the respective operation timings described above can be minimized. In turn, a decrease in the number of originals read in a unit time period when a skew of an original occurs can be minimized.

In addition, in the case where an original is not skewed, a cleaning operation of the reading surface of the image sensor 312 by the cleaning member 316, a rotational movement of the platen roller 125 which stops the same at a rotational position where a member of a preset background color (the white member 127 or the black member 126) opposes the image sensor 312, and a pickup operation of the next original can be started at minimal timings.

While a case where the cleaning member is mounted to the platen roller has been exemplified for the present embodiment, the present invention is not limited to this arrangement and, for example, a moving mechanism may be provided which causes the cleaning member to move between a position where the cleaning member contacts the surface of the image sensor and a position where the cleaning member does not contact the same. In this case, the control circuit 900 controls the moving mechanism so that cleaning of the surface of the image sensor is started after a time represented by T'+ (the distance between the registration sensor 314 and the cleaning position/S) has elapsed from the time point where the rear end of an original 308 is detected by the registration sensor 314.

An image reading apparatus that is a fourth embodiment of the present invention will now be described by appropriating FIGS. 17 and 18. Portions overlapping with the third embodiment described above will be described by appropriating reference characters used therein.

In the third embodiment described above, it will be understood that, if Tr denotes the time required to rotate the platen roller 125 to clean the reading surface of the image sensor 312 by the cleaning member 316 and until the platen roller 125 is stopped at a rotational position where the white member 127 or the black member 126 of the platen roller 125 opposes the image sensor 312, the cleaning of the reading surface of the image sensor 312 by the cleaning member 316 is completed after a time represented by T'+ (the distance between the registration sensor 314 and the platen roller 125/S)+Tr elapses from the time point where the rear end of an original 308 is detected by the registration sensor 314.

With the present fourth embodiment, the control circuit 900 controls the platen roller driving motor 315 so that although cleaning of the reading surface of the image sensor 312 is performed by the cleaning member 316 in the same manner as the third embodiment described above when the time represented by T'+ (the distance between the registration sensor 314 and the platen roller 125/S)+Tr is equal to or less than a time represented by (the distance between the platen roller 125 and the pickup roller 306/S), the cleaning of the reading surface of the image sensor 312 by the cleaning member 316 is not performed when the time represented by T'+ (the distance between the registration sensor 314 and the platen roller 125/S)+Tr exceeds the time represented by (the distance between the platen roller 125 and the pickup roller 306/S). When the position of the pickup roller 306 differs from the front end position of an original, a judgment is made in consideration thereof.

More specifically, when the skew amount of the original 308 is excessively large, since it is necessary to lengthen the time interval until the pickup of the next original to sufficiently widen the original interval, the decrease rate of the number of originals read in a unit time period will be large. Therefore, when the skew amount of the original 308 is excessively large, cleaning of the image sensor 312 by the cleaning member 316 is not performed. The cleaning is performed only when the skew amount of the original 308 is relatively small and the original interval enabling cleaning of the image sensor 312 by the cleaning member 316 without incident is equal to or less than a specified upper limit of original interval. Since the reduction of the time Tr for cleaning the image sensor 312 is better, the rotational speed of the platen roller 125 is desirably relatively higher than the speed of the conveyed original. Additionally, in the case where the rotation of the platen roller 125 may be started early in the same manner as the third embodiment described above in consideration of the delay from the time point where the rotation of the platen roller 125 is started to the time point where the cleaning member 316 actually performs cleaning, the above judgment may be made accordingly.

As described above, with the present embodiment, since cleaning of the image sensor 312 by the cleaning member 316 is not performed when the skew amount of the original 308 is excessively large, the decrease rate of the number of originals read in a unit time period can become small. Other configurations, operations and advantages are the same as the third embodiment described above.

The present embodiment has been arranged so that a skew amount of the original 308 is calculated and, when the skew amount increases as described above, cleaning of the image sensor 312 by the cleaning member 316 is not performed. However, the present invention may alternatively be arranged so that a skew amount of the original 308 is not calculated and a function for detecting only a presence of a skew exceeding a predetermined skew amount is provided instead, wherein, when a skew is detected, cleaning of the image sensor 312 by the cleaning member 316 is not performed.

In addition, while a case where the cleaning member is mounted on the platen roller has been exemplified for the present embodiment, the present invention is not limited to this arrangement and, for example, a moving mechanism may be provided which causes the cleaning member to move between a position where the cleaning member contacts the surface of the image sensor and a position where the cleaning member does not contact the same.

In this case, if Tr denotes the time necessary to drive the moving mechanism until cleaning of the surface of the image sensor is completed by the cleaning member, cleaning of the surface of the image sensor by the cleaning member is not performed if a time represented by T'+ (the distance between the registration sensor 314 and the cleaning position/S)+Tr exceeds a time represented by (the distance between the cleaning position and the pickup roller 306/S).

An image reading apparatus according to a fifth embodiment of the present invention will now be described with reference to FIG. 19. Portions overlapping with the third and fourth embodiments described above will be described by appropriating reference characters used therein.

Figure 19:
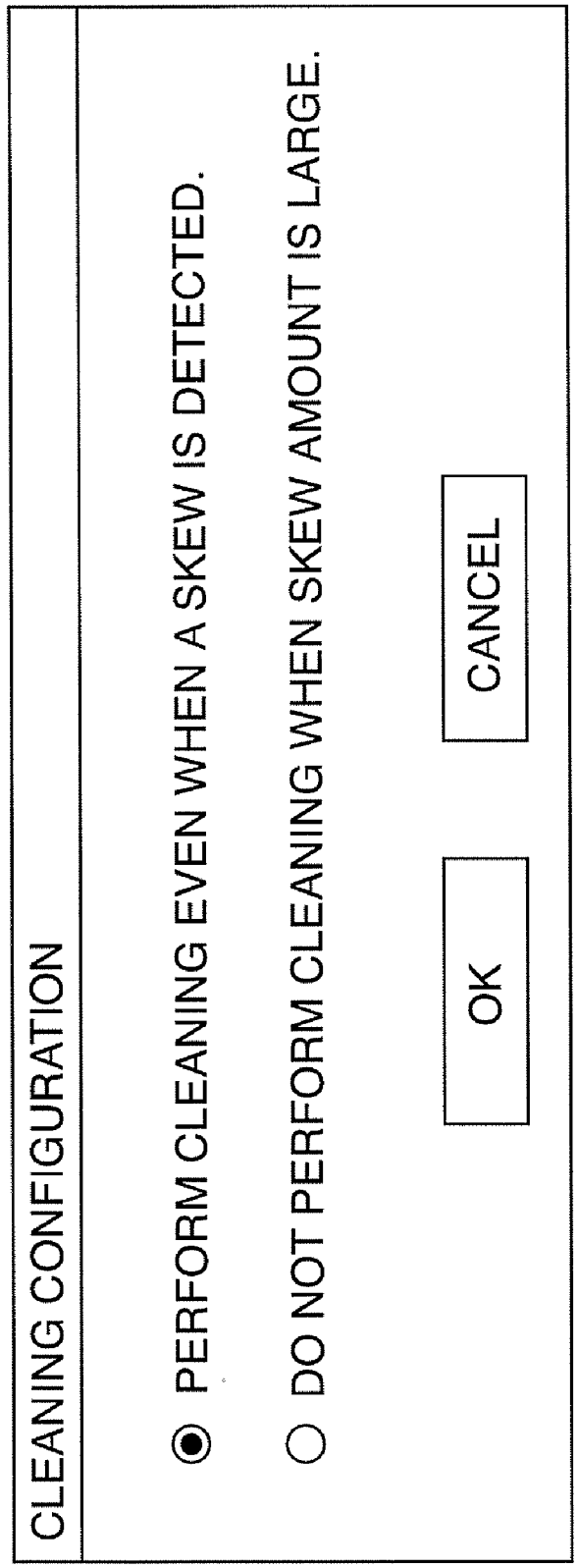
FIG. 19 is a diagram for explaining an image reading apparatus according to a fifth embodiment of the present invention.

With the present fifth embodiment, a cleaning mode setting screen such as that shown in FIG. 19 is displayed on an operation display portion of the image reading apparatus or a display portion of an external control apparatus (a PC or the like) connected to the image reading apparatus.

In the setting screen shown in FIG. 19, when "cleaning is performed if skew is detected" (hereinafter referred to as the "cleaning priority mode") is selected, the control circuit 900 performs the control of the third embodiment described above to alter timings according to the skew amount and performs cleaning, and when "cleaning is not performed if skew amount is large" (hereinafter referred to as the "speed priority mode") is selected, the control circuit 900 performs the control of the fourth embodiment described above. The speed priority mode may alternatively be arranged so that "cleaning is not performed when a skew is detected". As shown, with the present embodiment, since a cleaning priority mode and a speed priority mode can be selected, user convenience can be improved.

An image reading apparatus according to a sixth embodiment of the present invention will now be described with reference to FIG. 20. Portions overlapping with the third embodiment described above will be described by appropriating reference characters used therein.

A calculation example of a skew amount of the rear end of an original 308 by the control circuit 900 according to the present embodiment will be described with reference to FIG. 20.

Figure 20:
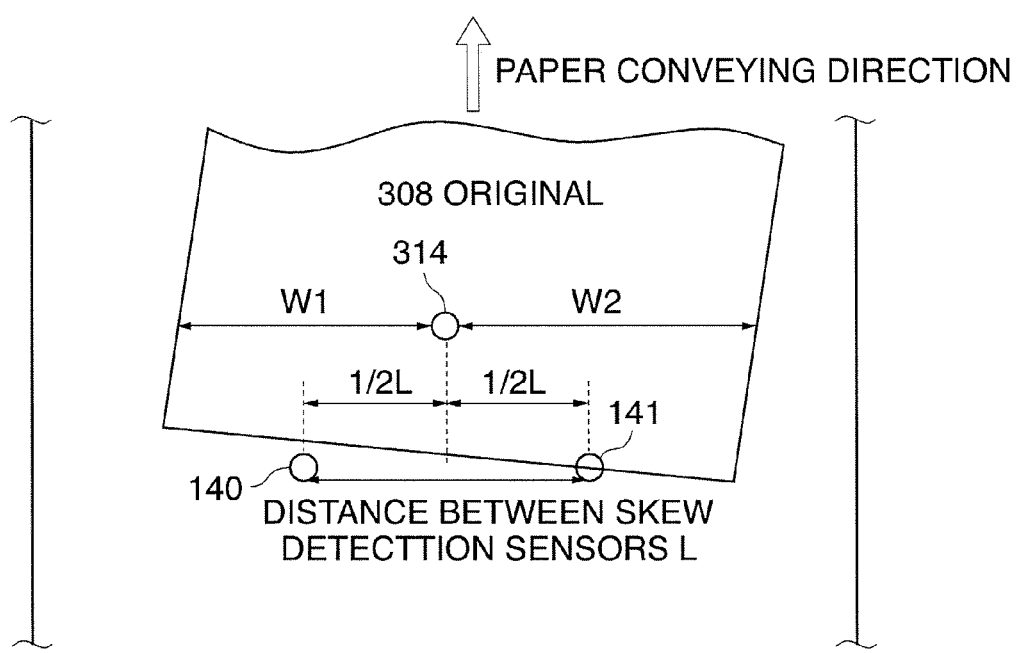
FIG. 20 is a diagram for explaining a calculation example of a skew amount of a rear end of an original by a control circuit in an image reading apparatus according to a sixth embodiment of the present invention.

In FIG. 20, when the original 308 skews, one skew detection sensor 140 first detects the rear end of the original 308 in the same manner as in the third embodiment described above. Next, as the original 308 is conveyed, the other skew detection sensor 141 detects the rear end of the original 308.

Now, let: L denote the distance between the skew detection sensors 140 and 141; S denote the conveying speed of the original 308; T denote a difference in the detection times of the skew detection sensors 140 and 141; W1 denote a measurement from the registration sensor 314 to the left-hand side edge of the original 308 as detected by an original width detection sensor, not shown; and W2 denote a measurement from the registration sensor 314 to the right-hand side edge of the original 308.

If T' denotes a time elapsed from the time point where the rear end of an original 308 is detected by the registration sensor 314 to the time point where the right-hand side corner portion of the skewed and delayed original 308 reaches the same position as the registration sensor 314, a relationship represented by L:ST=W2:ST' is true. From this relationship, T'=(T×W2)/L is derived.

In other words, the control circuit 900 calculates the above-mentioned time T', and when a time represented by T'+ (the distance between the registration sensor 314 and the platen roller 125/S) has elapsed from the time point where the rear end of the original 308 is detected by the registration sensor 314, the control circuit 900 controls the platen roller driving motor 315 so that: the platen roller 125 is rotated to cause the cleaning member 316 mounted on the platen roller 125 to clean the reading surface of the image sensor 312; the platen roller 125 is stopped at a rotational position where a member of a preset background color (the white member 127 or the black member 126) opposes the image sensor 312; and the stopped state is subsequently maintained.

In addition, at this point, the control circuit 900 controls the pickup roller driving motor 905 to adjust the pickup timing by the pickup roller 306 so that the next original does not reach the platen roller 125. Furthermore, W1 is used instead of W2 in the case where the original 308 is skewed to the opposite side and a delay occurs on the left-hand side in the width direction of the original 308.

According to the present embodiment, since control is performed by detecting the width of an original 308 by an original width detection sensor and calculating a passage time of a skewed original 308 according to the original width, the respective timings of a cleaning operation of the reading surface of the image sensor 312 by the cleaning member 316, a rotational movement of the platen roller 125 to stop the same at a rotational position where the white member 127 or the black member 126 opposes the image sensor 312, and a pickup operation of the next original can be adjusted with a high degree of accuracy. Other configurations, operations and advantages are the same as the third embodiment described above.

While a case where the cleaning member is mounted on the platen roller has been exemplified for the present embodiment, the present invention is not limited to this arrangement and, for example, a moving mechanism may be provided which causes the cleaning member to move between a position where the cleaning member contacts the surface of the image sensor and a position where the cleaning member does not contact the same. In this case, the control circuit 900 controls the moving mechanism so that cleaning of the surface of the image sensor is started after a time represented by T'+ (the distance between the registration sensor 314 and the cleaning position/S) has elapsed from the time point where the rear end of the original 308 is detected by the registration sensor 314.

It is to be understood that the present invention is not limited to the exemplary embodiment described above and that various modifications may be made without departing from the scope of the following claims.

For example, while a skew amount is determined in the embodiment described above by measuring a difference T between the detection times of the skew detection sensors 140 and 141, a occurrence of a skew equal to or exceeding a predetermined skew amount may alternatively be detected using a method such as securing a time interval corresponding to a predetermined skew amount and subsequently performing detection of the original by the skew detection sensors 140 and 141. In addition, a detection operation may be terminated and a judgment that a skew is equal to or greater than a predetermined skew amount may be made when one of the skew detection sensors 140 and 141 detects the rear end of the original but the other skew detection sensor does not detect the rear end of the original even after a predetermined time period has elapsed.

Furthermore, a simplified control may be performed such that, when a skew equal to or exceeding a predetermined skew amount is detected, the timing at which the platen roller is rotated or a pickup timing is altered by a predetermined amount of time.

In the embodiment described above, while a registration sensor and a skew detection sensor are separately provided in order to accurately calculate a read start timing and the like, it is also possible to omit the registration sensor and have the skew detection sensor substitute the functions of the registration sensor. For example, a substitution is possible where the timing at which the front end or the rear end of the original to be detected by the registration sensor is substituted with an average timing calculated by averaging the detection timings of the two skew detection sensors.

In addition, the timing at which an original reaches the image sensor may be altered by adjusting the rotational speeds of the feeding roller or the convey roller. Furthermore, the convey roller disposed immediately before the image sensor may be arranged as a registration roller that is temporarily stoppable, wherein the timing at which an original reaches the image sensor may be controlled based on a stoppage time.

Figure 21:
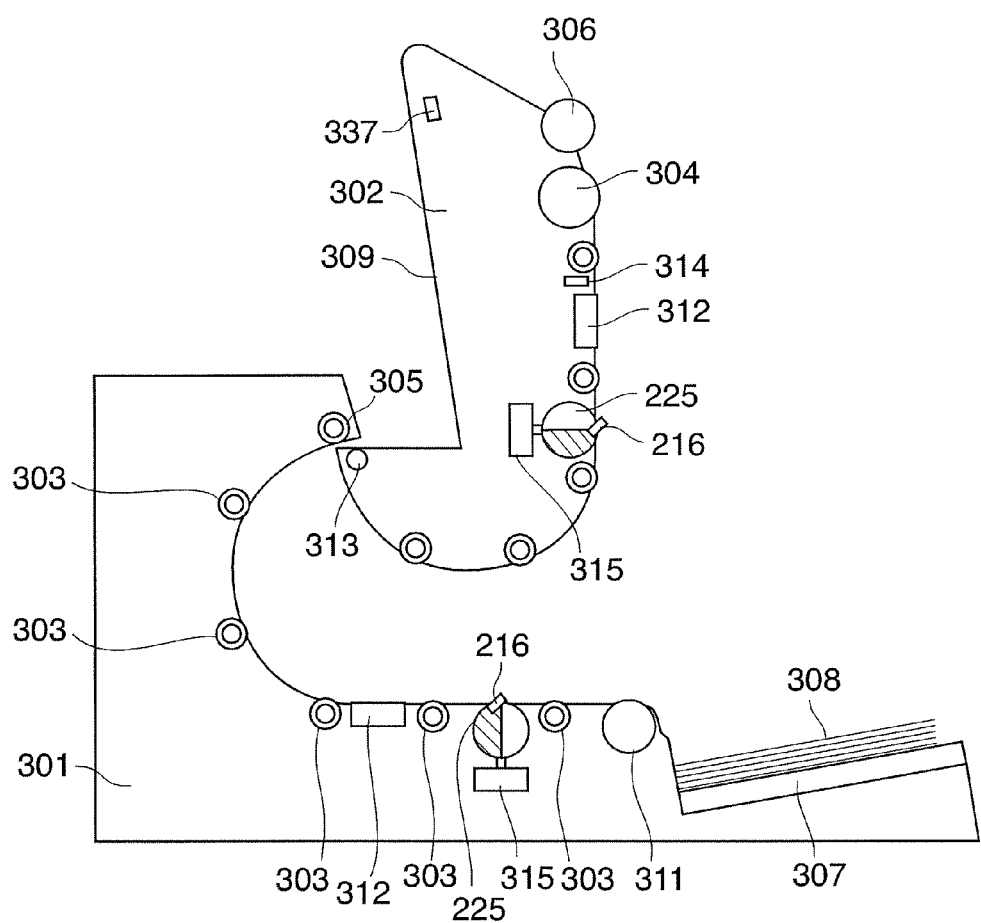
FIG. 21 is a cross-sectional diagram schematically showing a configuration of an image reading apparatus according to a seventh embodiment of the present invention.

FIG. 21 is a cross-sectional diagram schematically showing a configuration of an image reading apparatus according to a seventh embodiment of the present invention. An image reading apparatus according to the seventh embodiment has fundamentally the same construction as the conventional image reading apparatus already described with reference to FIG. 30, and therefore corresponding elements are designated by identical reference numerals and description thereof is omitted.

FIG. 21 is a diagram showing a state where the upper unit 302 is turned upwards via the hinge 313 with respect to the lower unit 301 to realize an opened state of an original conveying section that conveys an original 308, and the original conveying section has been exposed.

When an opened state of the original conveying section is detected by an opening-closing detection sensor 337, a control circuit, not shown, drives the platen roller driving motor 315 that is a stepping motor or the like to rotate a platen roller 225 so that the same stops at a rotational position where a cleaning member 216 mounted to the platen roller 225 is exposed to the original conveying position. In the state where the rotation of the platen roller 225 is stopped, a constant holding torque is applied by the excitation of the platen roller driving motor 315. In addition to a holding torque by the excitation of the platen roller driving motor 315, the holding torque may also include friction, a mechanical load of a gear, a holding torque generated by a detent torque, or the like.

The detection of the platen roller 225 rotating to a rotational position where the cleaning member 216 is exposed to the original conveying position can be exemplified by a detection by an optical sensor, a detection by a mechanical switch, and the like. However, the detection is not limited to these examples. In addition, the present invention may be arranged so as not to perform detection of the platen roller 225 rotating to a rotational position where the cleaning member 216 is exposed to the original conveying position. For example, the platen roller 225 may be rotated so that the cleaning member 216 stops at a rotational position where the same is exposed to the original conveying position by configuring the platen roller 225 so as to be rotatable within a predetermined rotational angle range and controlling the rotational driving amount of the platen roller driving motor 315 from a predetermined rotational limit position.

Next, the platen roller 225 will be described with reference to FIG. 23.

Figure 23:
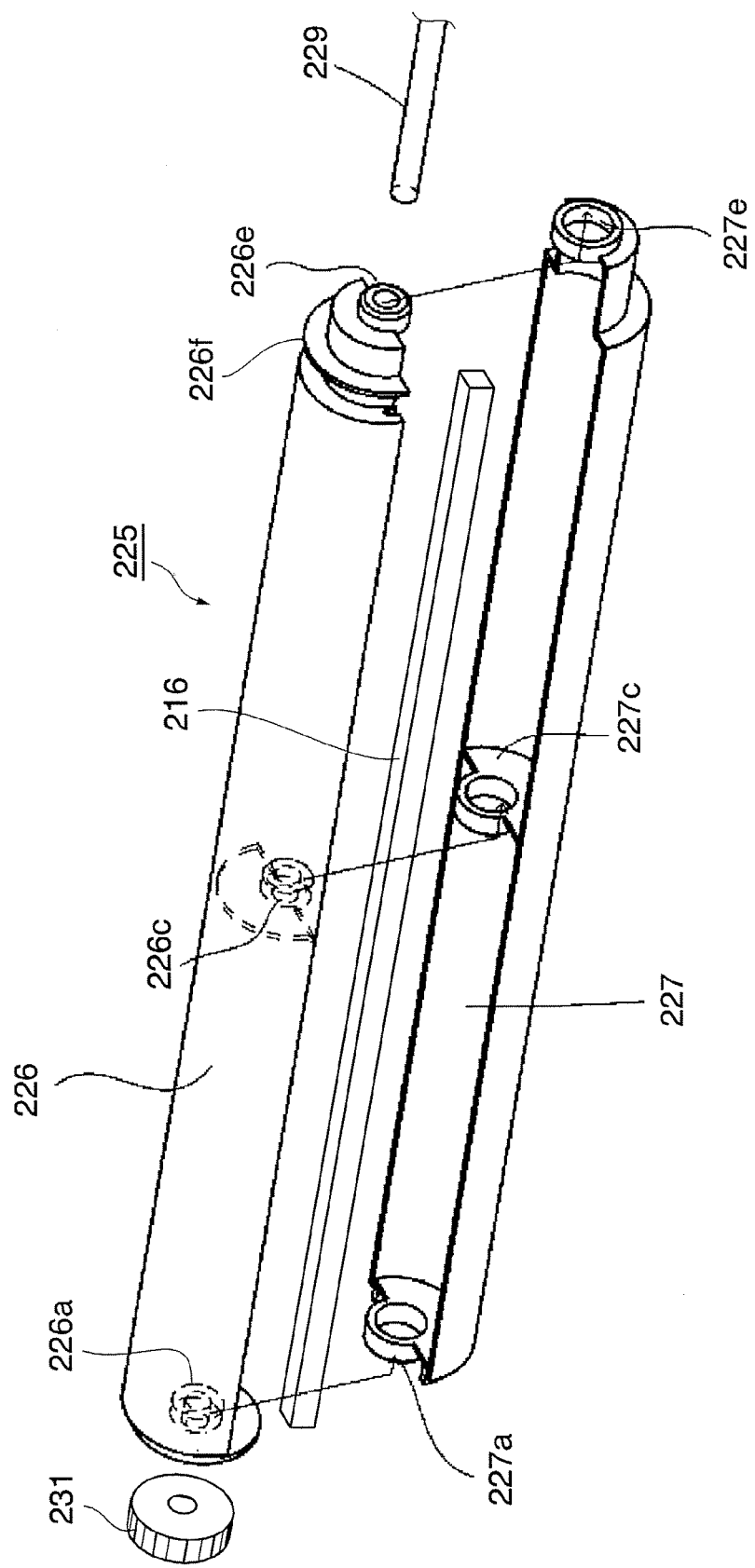
FIG. 23 is an exploded perspective view showing a configuration of a platen roller.

As shown in FIG. 23, the platen roller (rotational member) 225 includes a half-cylindrical black member 226, a half-cylindrical white member 227 and a cleaning member 216 that cleans the reading surface of the image sensor 312.

Both axial end portions and the axial center portion of the black member 226 are coaxially provided with, for example, cylindrical fitted portions 226a and 226e respectively protruding in a same axial direction and a fitted portion 226c. In addition, a half disk-shaped light intercepting portion 226f for detecting a rotational position of the platen roller 225 is provided in the vicinity of the fitted portion 226e of the black member 226. The light intercepting portion 226f is not limited to any particular shape or size.

Due to the rotation of the platen roller 225, the light intercepting portion 226f intercepts incident light to a light receiving portion of a platen roller position detecting sensor 235 (refer to FIGS. 27 and 28) constituted by a photointerrupter or the like. The light intercepting portion 226f is integrally formed as a part of the black member 226. This eliminates the need to separately provide a member for intercepting incident light to the light receiving portion of the platen roller position detecting sensor 235. As a result, a simpler structure as well as a reduction in cost may be achieved.

In the case where the light transmission rate of the white member 227 is low, it is also possible to integrally form a light intercepting portion as a part of the white member 227.

Both axial end portions and the axial center portion of the white member 227 are coaxially provided with, for example, cylindrical receiving portions 227a and 227e and a receiving portion 227c into which the fitted portions 226a and 226e and the fitted portion 226c are respectively axially fitted.

In order to combine the black member 226 and the white member 227, first, the black member 226 and the white member 227 are matched in a radial direction in a state where the fitted portions 226a and 226e and the fitted portion 226c of the black member 226 are displaced towards one axial end side (the left-hand side in FIG. 23) with respect to the receiving portions 227a and 227e and the receiving portion 227c of the white member 227. At this point, a cleaning member 216 is interposed between joint portions on one side among joint portions of the black member 226 and the white member 227 on both sides thereof along the axial direction.

Next, by relatively sliding the black member 226 towards the other axial end side (the right-hand side in FIG. 23) with respect to the white member 227, the fitted portions 226a and 226e and the fitted portion 226c of the black member 226 are moved in the axial direction and are fitted into the receiving portions 227a and 227e and the receiving portion 227c of the white member 227. Consequently, the black member 226 and the white member 227 are combined and, at the same time, the cleaning member 216 is mounted between the black member 226 and the white member 227 so as to protrude therefrom. After combining the black member 226 and the white member 227 in this manner, separation of the black member 226 from the white member 227 is prevented using a snap-fit portion or the like, not shown.

Subsequently, by inserting a shaft 229 into an inner circumferential portion of the fitted portions 226a, 226c and 226e of the black member 226, a cylindrical platen roller 225 with the shaft 229 protruding from both axial ends thereof is formed. The male and female fitting structure of the black member 226 and the white member 227 are not limited to any particular structure and various male and female fitting structures can be employed.

Figure 22:
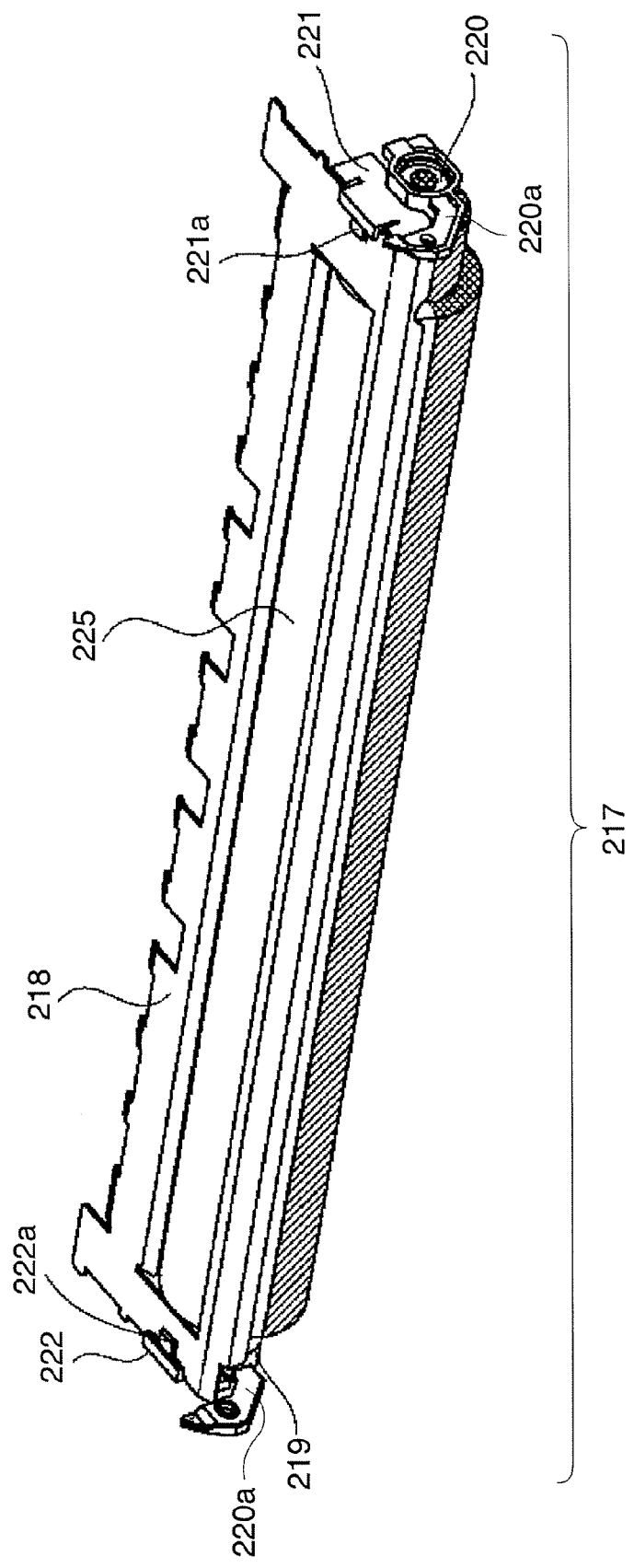
FIG. 22 is a perspective view showing a configuration of a platen roller assembly.

FIG. 22 is a perspective view showing a configuration of a platen roller assembly 217 comprising the platen roller 225, holding members 221 and 222, and a convey guide 218.

The holding members 221 and 222 hold the convey guide 218 that guides a conveyed original 308 and also holds the shaft 229 protruding from both axial ends of the platen roller 225 so as to be rotatable via shaft bearing portions 219 and 220.

A predetermined clearance gap between the platen roller 225 and the image sensor 312 is secured by having the image sensor 312 abut spacer portions 221a and 222a of the holding members 221 and 222 when the conveying section returns the closed state after the platen roller assembly 217 is mounted to the apparatus main unit.

Figure 24:
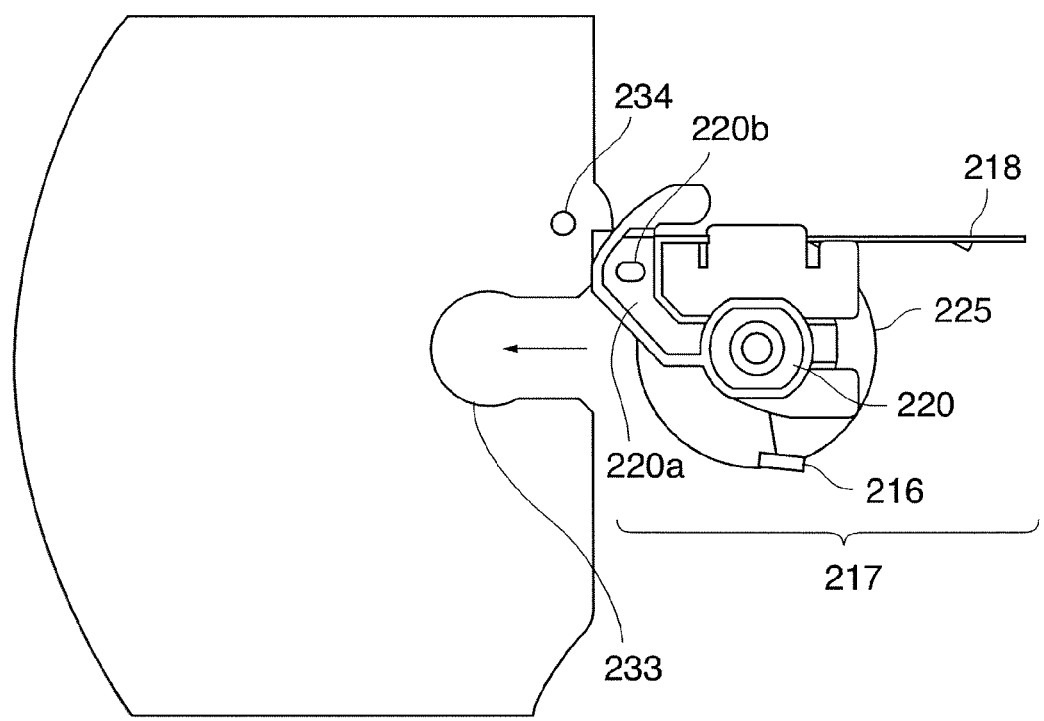
FIG. 24 is a diagram for explaining a mounting method of the platen roller assembly to an apparatus main body.

FIG. 24 is a diagram for explaining a mounting method of the platen roller assembly 217 to the apparatus main body.

In order to mount the platen roller assembly 217 to the apparatus main body, first, as shown in FIG. 21, the upper unit 302 is turned with respect to the lower unit 301 to set the original conveying section to an opened state. As shown in FIG. 24, mounting portions 233 notched in an approximately U-shape are provided on both side walls in the width direction of the original of the upper unit 302 perpendicular to the conveying direction of the original 308.

The shaft bearing portions 219 and 220 are inserted in the respective mounting portions 233 of the upper unit 302 in a state of the platen roller assembly 217 where the convey guide 218 is disposed above and an axis line of the platen roller 225 is arranged in a width direction of the upper unit 302.

In this state, the platen roller assembly 217 is mounted to the upper unit 302 by rotating the platen roller assembly 217 around the axis line of the platen roller 225.

More specifically, as shown in FIG. 24, protrusions 234 are provided above the mounting portions 233 of the upper unit 302, and arm portions 220a are respectively fixed to shaft bearing portions 219 and 220 provided on the holding members 221 and 222 of the platen roller assembly 217. The arm portions 220a may alternatively be integrally formed with the shaft bearing portions 219 and 220 or with the holding members 221 and 222.

The arm portions 220a are formed by elastic members and are provided with locking portions 220b to be attachably/detachably locked to the protrusions 234 of the upper unit 302.

Figure 25:
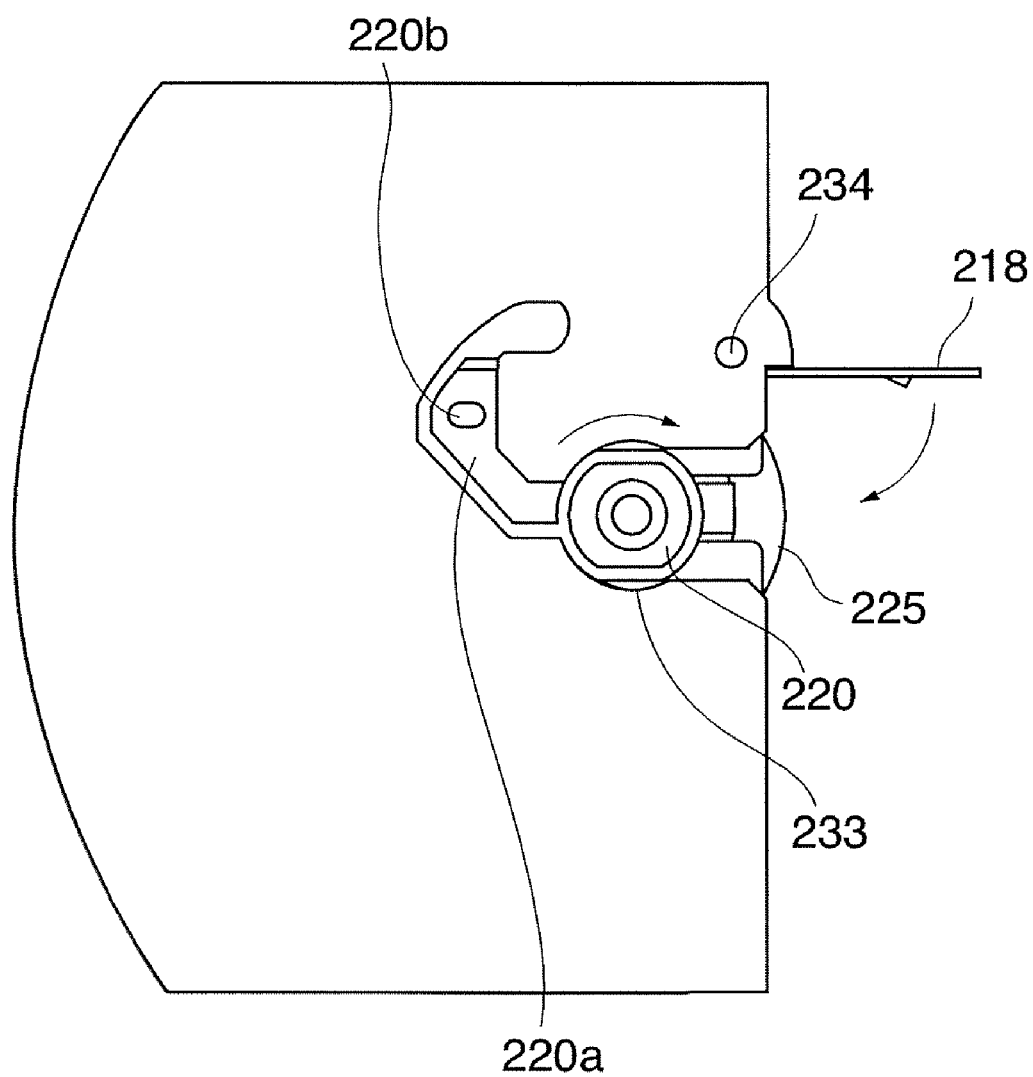
FIG. 25 is a diagram for explaining a mounting method of the platen roller assembly.
Figure 26:
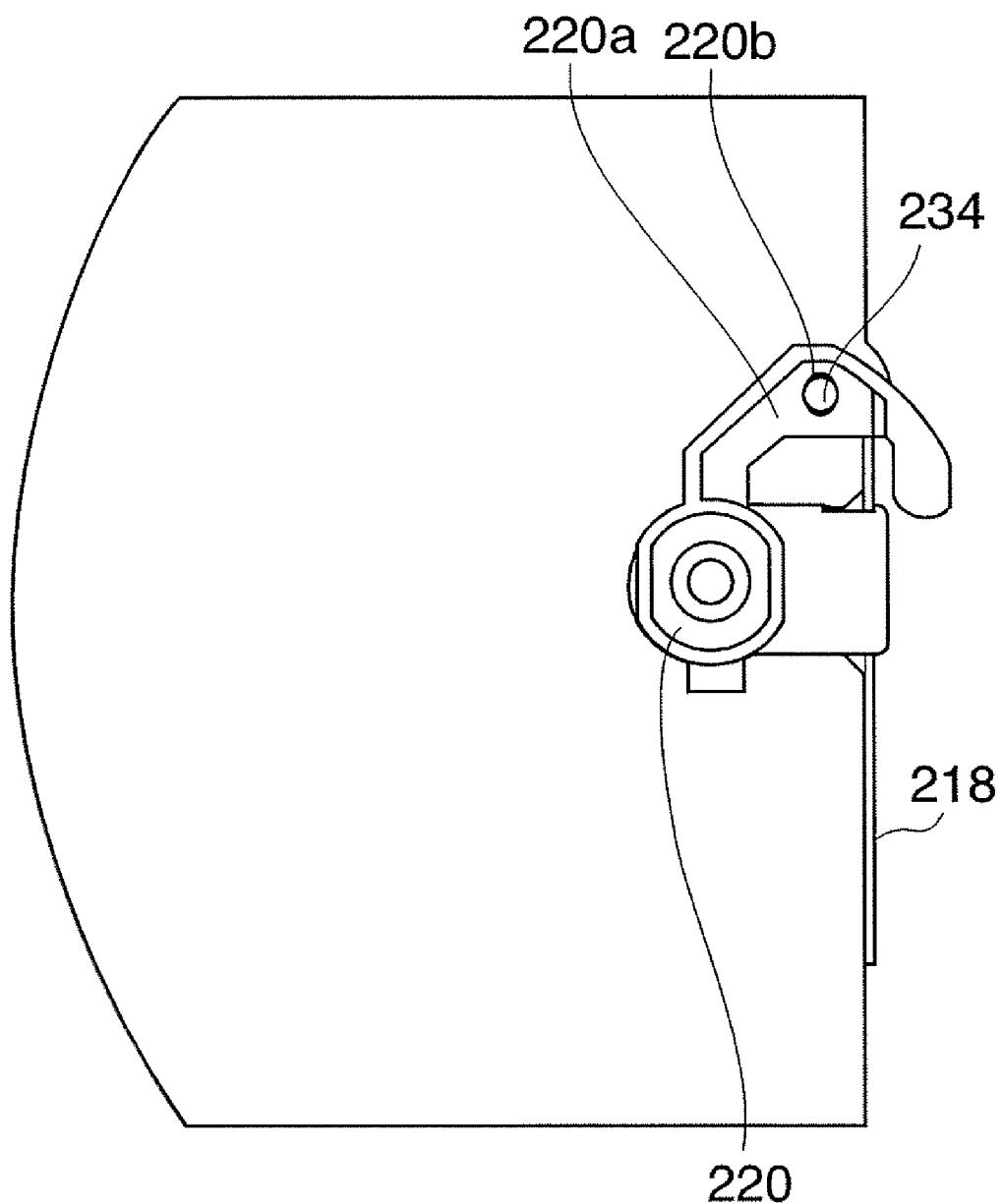
FIG. 26 is a diagram for explaining a mounting method of the platen roller assembly.

Next, as shown in FIGS. 25 and 26, in a state where the convey guide 218 is disposed above, the shaft bearing portions 219 and 220 of the platen roller assembly 217 are inserted into and struck against the mounting portions 233 of the upper unit 302 (refer to FIG. 25).

In this state, by rotating the platen roller assembly 217 around the axis of the platen roller 225 by 90 degrees (in the direction indicated by the arrow in FIG. 25), the arms 220a bend and climb over the protrusions 234 and the locking portions 220b are locked by the protrusions 234 (refer to FIG. 26). Accordingly, the platen roller assembly 217 can be readily mounted to the upper unit 302.

On the other hand, when detaching the platen roller assembly 217 from the upper unit 302, after bending the arms 220a and unlocking the locking portions 220b from the protrusions 234, the above-described mounting process is performed in reverse. In this manner, the platen roller assembly 217 can be readily detached from the upper unit 302. Besides the upper unit 302, the platen roller assembly 217 can also be attachably/detachably mounted to the lower unit 301 in the same manner as described above.

Figure 27:
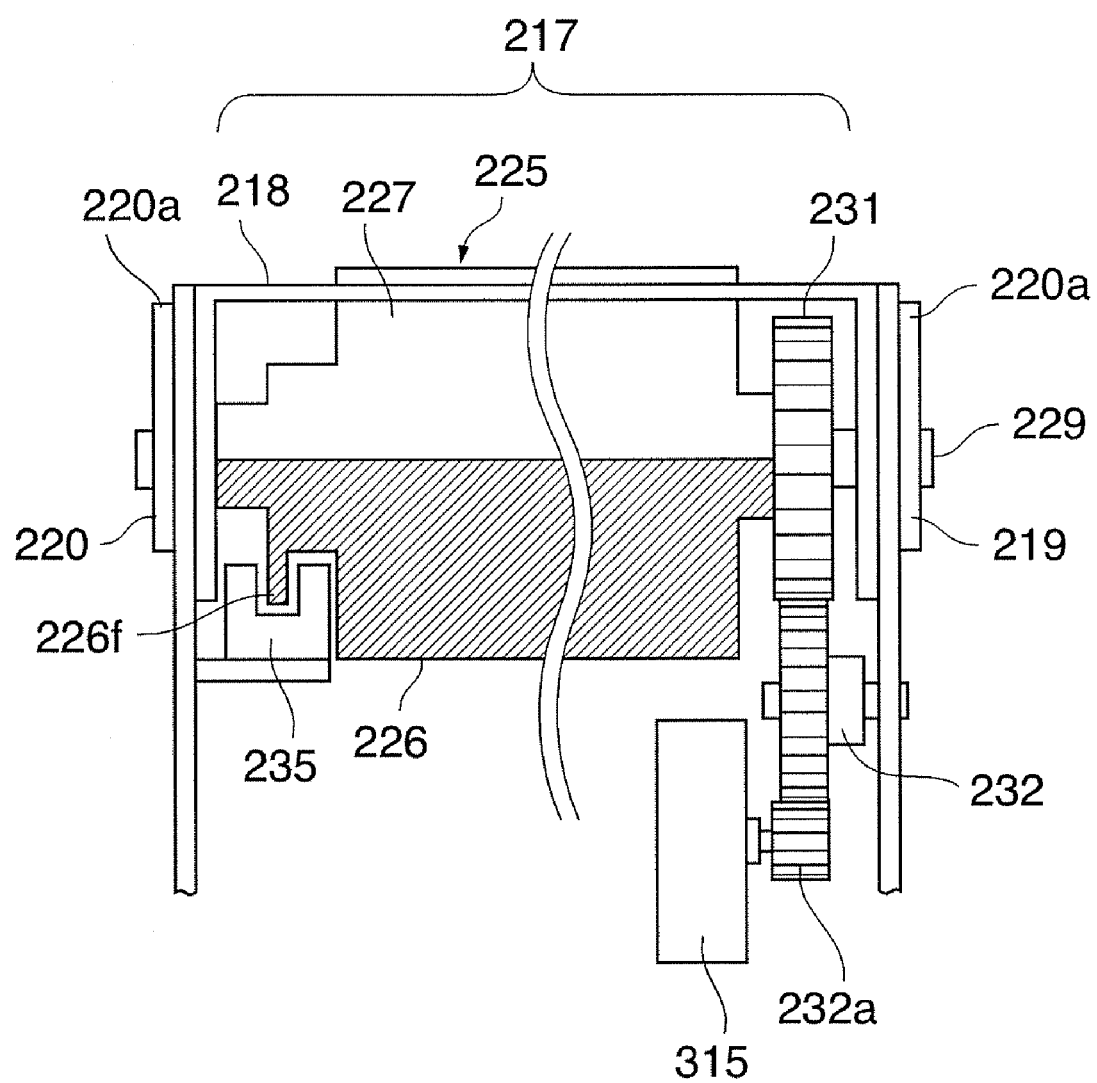
FIG. 27 is a diagram showing a state where a platen roller assembly is mounted to the apparatus main body.

FIG. 27 is a diagram showing a state where the platen roller assembly 217 is mounted to the apparatus main body. When the platen roller assembly 217 is mounted to the apparatus main body, a gear 232 on the apparatus main body side meshes with a gear 231 fixed on the shaft 229 protruding from the end portion of the platen roller 225 on the opposite side of the light intercepting portion 226f, and a gear 232a fixed on the motor shaft of the platen roller driving motor 315 meshes with the gear 232. Therefore, the platen roller 225 is rotationally driven by the driving of the platen roller driving motor 315.

Consequently, the light intercepting portion 226f mounted on the platen roller 225 is now able to proceed to a position where incident light to the light receiving portion of the platen roller position detecting sensor 235 can be intercepted, and a control circuit, not shown, becomes capable of recognizing the rotational position of the platen roller 225 and controlling the rotational movement of the same.

Figure 28:
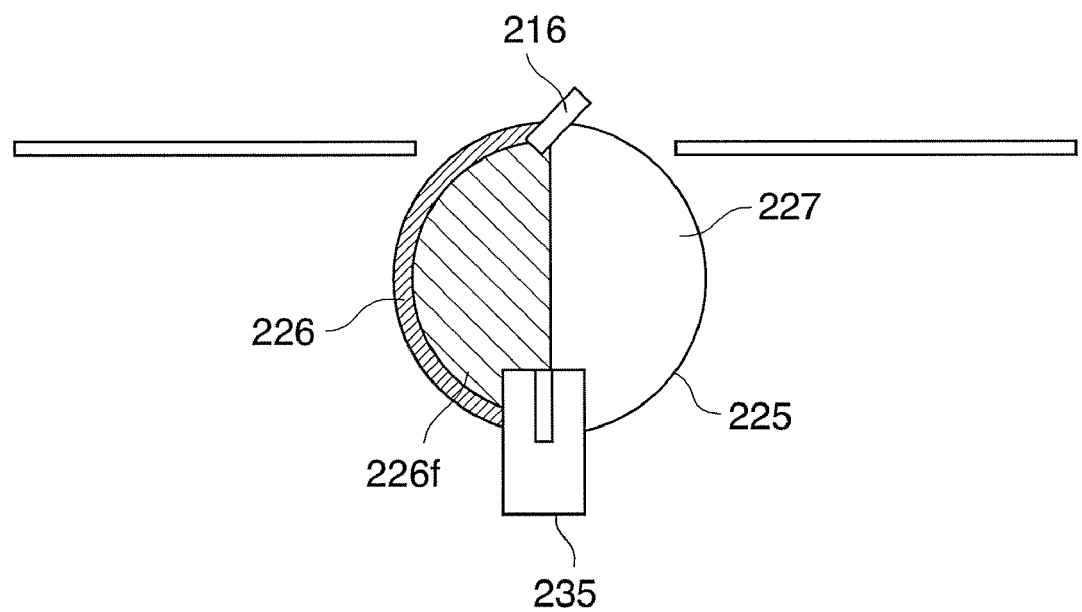
FIG. 28 is a diagram for explaining a positional relationship of the platen roller assembly during cleaning by a cleaning member.

In other words, as shown in FIG. 28, the control circuit detects the rotational position of the platen roller 225 based on a time point where the light intercepting portion 226f mounted on the platen roller 225 causes a variation in the output of the platen roller position detecting sensor 235. Subsequently, the platen roller 225 can be rotationally moved to an arbitrary rotational position by driving the platen roller driving motor 315 by a desired amount.

Consequently, the rotational movement of the platen roller 225 is controlled so as to stop at a rotational position where the cleaning member 216 is exposed to the original conveying section when the opening-closing detection sensor 337 detects an opened state of the original conveying section.

The example shown in FIG. 28 is arranged so that, when the cleaning member 216 is exposed to the original conveying section, a state is assumed where incident light to the light receiving portion of the platen roller position detecting sensor 235 is intercepted by the light intercepting portion 226f of the platen roller 225.

In addition, the platen roller 225 is arranged to be stopped at a rotational position where the cleaning member 216 is exposed to the original conveying portion by stopping the rotation of the platen roller 225 immediately after a detection of a transition from a state where incident light to the light receiving portion of the platen roller position detecting sensor 235 is not intercepted by the light intercepting portion 226f to a state where incident light to the light receiving portion of the platen roller position detecting sensor 235 is intercepted by the same.

In a state where interception of incident light to the light receiving portion of the platen roller position detecting sensor 235 by the light intercepting portion 226f of the platen roller 225 is detected, a constant holding torque is applied to the platen roller driving motor 215 so as to prevent the platen roller 225 from rotating when the user cleans the cleaning member 216 exposed to the original conveying position.

Furthermore, when the cleaning member 216 is cleaned after detaching the platen roller assembly 217 from the apparatus main body, incident light to the light receiving portion of the platen roller position detecting sensor 235 is no longer intercepted by the light intercepting portion 226f of the platen roller 225. In this case, the control circuit judges that the platen roller assembly 217 has been detached from the apparatus main body and stops applying the holding torque to the platen roller driving motor 215.

Figure 29:
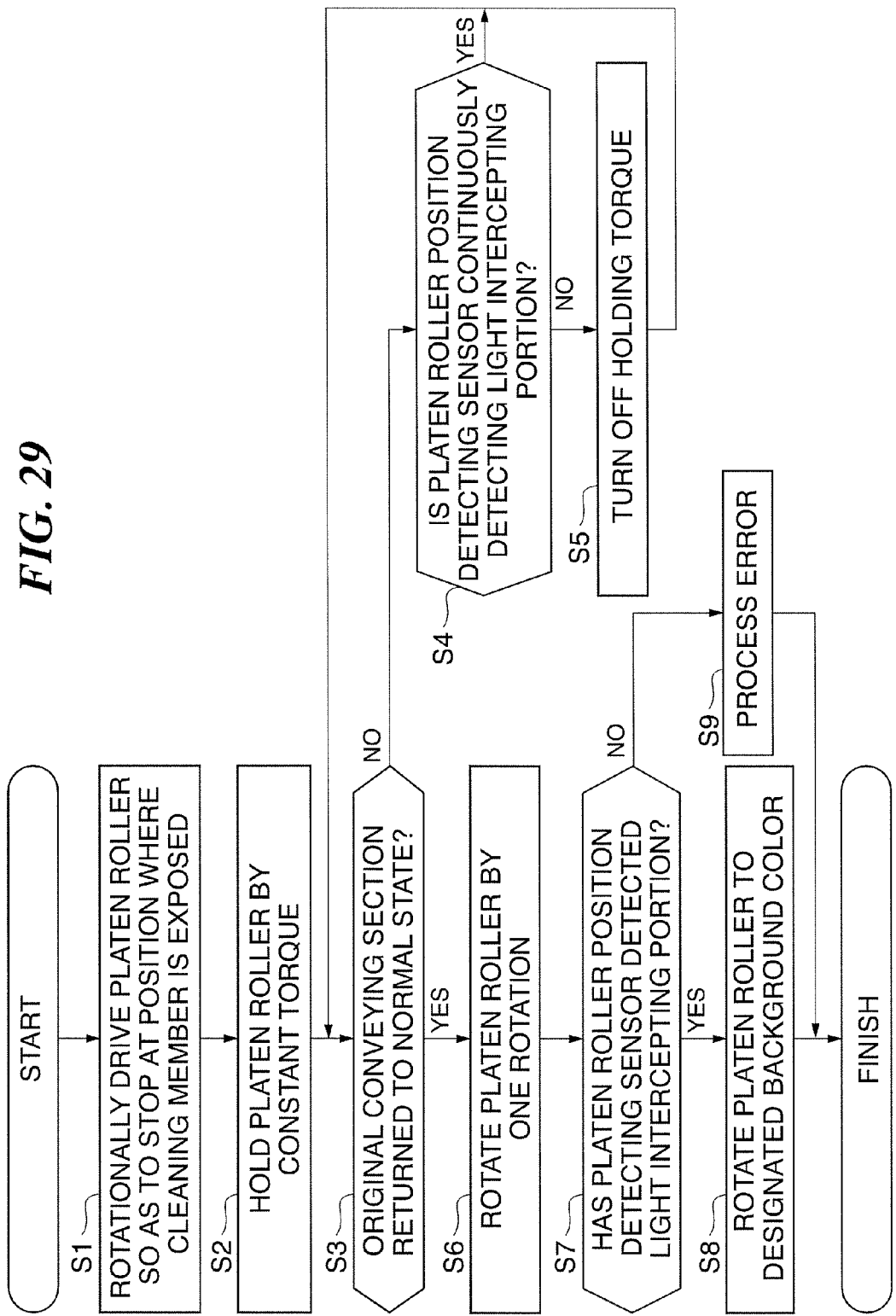
FIG. 29 is a flowchart for explaining operations of an image reading apparatus according to the seventh embodiment of the present invention.

Next, operations of the image reading apparatus according to the present seventh embodiment will be described with reference to FIG. 29. FIG. 29 is a flowchart for describing operations started when the upper unit 302 is turned upwards to be opened and the original conveying section assumes an opened state and culminating, and that operation terminated when the upper unit is turned downwards to be closed and the original conveying section is returned to a closed state (normal state). The respective processes depicted in FIG. 29 are executed when a control program stored in a storage unit (a ROM, a hard disk or the like) of the apparatus main body is loaded on a RAM or the like by a CPU or the like mounted on the control circuit.

As shown in the flowchart of FIG. 29, when the upper unit 302 is turned upwards to be opened and the opening-closing detection sensor 337 detects that the original conveying section has been opened, driving by the platen roller driving motor 315 is controlled to rotate the platen roller 225 so that the platen roller 225 stops at a rotational position where the cleaning member 216 is exposed to the original conveying position (step S1).

Next, in step S2, a constant holding torque is applied to the platen roller driving motor 315 to hold the platen roller 225 so as to prevent the platen roller 225 from rotating during the user cleans the cleaning member 216. The process then proceeds to step S3.

In step S3, for the original conveying section in the opened state, a judgment is made based on a detection signal from the opening-closing detection sensor 337 on whether the original conveying section has returned to a closed state (normal state) or not. When a return cannot be confirmed, the process proceeds to step S4. When a return is confirmed, the process proceeds to step S6.

In step S4, a judgment is made on whether incident light to the light receiving portion of the platen roller position detecting sensor 235 is intercepted by the light intercepting portion 226f of the platen roller 225 or not. If so, the process returns to step S3, and if not, the process proceeds to step S5.

In step S5, after suspending the applying of the holding torque by the platen roller driving motor 315, the process returns to step S3.

Meanwhile, if a return to a closed state is confirmed in step S3, the process proceeds to step S6 to drive the platen roller driving motor 315 so that the platen roller 225 rotates for one rotation or more. Accordingly, cleaning of the reading surface of the image sensor 312 is performed by the cleaning member 216.

Next, in step S7, a judgment is made on whether or not an interception of incident light to the light receiving portion of the platen roller position detecting sensor 235 by the light intercepting portion 226f of the platen roller 225 has been detected during the rotation of the platen roller 225 in step S6. If detected, the process proceeds to step S8, and if not, the process proceeds to step S9.

In step S8, the platen roller driving motor 315 is driven so as to rotate the platen roller 225 so that a member of a selected background color among the white member 227 and the black member 226 of the platen roller 225 opposes the image sensor 312 and to retreat the cleaning member 216 into a retract position, and subsequently concludes the series of processes.

On the other hand, in step S9, supposing that the platen roller assembly 217 is not mounted to the apparatus main body, processes including an error display or the like are executed, and the series of processes is concluded.

As described above, according to the present embodiment, since the cleaning member 216 mounted to the platen roller 225 is exposed to the original conveying position and stopped when an opened state of the original conveying section is detected, contaminants adhering to and accumulated on the cleaning member 216 can be readily removed by the user and occurrences of image degradation can be suppressed.

In addition, since a wasteful holding torque is no longer applied to the platen roller driving motor 315 when detaching the platen roller assembly 217 from the apparatus main body to clean the cleaning member 216 or the like, contributions can be made towards saving energy.

Furthermore, since a holding torque is not applied to the platen roller driving motor 315 when mounting the platen roller assembly 217 to the apparatus main body is performed, gears 231, 232a and 232 are able to rotate freely to enable a mounting operation of the platen roller assembly 217 to be performed in a smooth manner.

It is to be understood that the present invention is not limited to the exemplary embodiment described above and that various modifications may be made without departing from the scope of the following claims.

For example, while a case where the cleaning member is mounted to the platen roller has been exemplified for the embodiment described above, the present invention is not limited to this arrangement. Alternatively, for example, a moving mechanism may be provided which causes the cleaning member to move between a position where the cleaning member is exposed to the original conveying position and a position where the cleaning member is not exposed to the same, wherein the moving mechanism is controlled so that the cleaning member is exposed when an opened state of the original conveying section is detected.

In addition, instead of having the cleaning member always exposed when the original conveying section is opened, the cleaning member may be arranged to be exposed according to an opened state of the original conveying section when a problem is detected in an image reading signal or read image data during the acquisition of shading correction data or the like. Furthermore, the cleaning member may be arranged to be exposed according to an opened state of the original conveying section whenever a predetermined number of originals or more is conveyed. Moreover, a sensor may be provided which detects that an operation for opening the original conveying section, such as an operation of a knob, not shown, has been performed, wherein the cleaning member is exposed when a detection is made by the sensor.

It is to be understood that the object of the present invention may also be accomplished by supplying a system or an apparatus with a storage medium in which a program code of software which realizes the functions of the above-described embodiments is stored, and causing a computer (or a CPU or an MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above-described embodiments may be accomplished not only by executing a program code read out by a computer, but also by causing an OS (operating system) or the like which operates on the computer to perform a part or all of the actual operations based on instructions of the program code.

Further, it is to be understood that the functions of the above-described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions. Arbitrary constituent element of arbitrary embodiment described above can be added to other embodiment, and such modified embodiment is included in this invention.

This application claims the benefit of Japanese Application Nos. 2007-089584, 2007-089583, and 2007-089576, filed Mar. 29, 2007, which is hereby incorporated by reference herein in its entirety.

What is claimed is:

1. An image reading apparatus comprising:
    a conveying unit configured to convey an original;
    an image sensor configured to read an image of the original via a contact member having a surface which an original conveyed by said conveying unit may contact;
    a turning member configured to rotate or swing and disposed at a position opposing said image sensor;
    a cleaning member disposed on said turning member, and configured to clean said surface of said contact member;
    a driving unit configured to turn said turning member; and
    a controlling unit configured to control said driving unit to turn said turning member so that cleaning of said contact member is performed by said cleaning member during conveyance of the original after the original which is still being conveyed by said conveying unit has passed an image reading position of said image sensor and before a subsequent original reaches the image reading position.

2. An image reading apparatus as claimed in claim 1, further comprising an original detecting unit configured to detect at least one of a front end and a rear end of an original conveyed by said conveying unit,
    wherein said controlling unit is further configured to control said driving unit so that, when the original detecting unit detects a front end of an original, the surface of said contact member is cleaned by said cleaning member before the front end of that original reaches the image reading position, and/or when said original detecting unit detects a rear end of an original, the surface of said contact member is cleaned by said cleaning member after the rear end of that original has passed the image reading position of said image sensor.

3. An image reading apparatus comprising:
a conveying unit configured to convey an original;
an original detecting unit configured to detect at least one of a front end and a rear end of an original conveyed by said conveying unit;
an image sensor configured to read an image of the original via a contact member having a surface which an original conveyed by said conveying unit may contact;
a turning member configured to rotate or swing and disposed at a position opposing said image sensor;
a cleaning member disposed on said turning member, and configured to clean said surface of said contact member;
a driving unit configured to turn said turning member; and
a controlling unit configured to control said driving unit to turn said turning member so that, when the original detecting unit detects a front end of an original, the surface of said contact member is cleaned by said cleaning member before the front end of that original reaches the image reading position, and/or when said original detecting unit detects a rear end of an original, the surface of said contact member is cleaned by said cleaning member after the rear end of that original has passed the image reading position of said image sensor, whereby cleaning of said contact member is performed by said cleaning member after the original has passed an image reading position of said image sensor and before a subsequent original reaches the image reading position;
wherein said controlling unit controls said driving unit to cause said turning member to turn every time a predetermined number of originals is conveyed.

4. An image reading apparatus comprising:
a conveying unit configured to convey an original;
an original detecting unit configured to detect at least one of a front end and a rear end of an original conveyed by said conveying unit;
an image sensor configured to read an image of the original via a contact member having a surface which an original conveyed by said conveying unit may contact;
a turning member configured to rotate or swing and disposed at a position opposing said image sensor;
a cleaning member disposed on said turning member, and configured to clean said surface of said contact member;
a driving unit configured to turn said turning member; and
a controlling unit configured to control said driving unit to turn said turning member so that, when the original detecting unit detects a front end of an original, the surface of said contact member is cleaned by said cleaning member before the front end of that original reaches the image reading position, and/or when said original detecting unit detects a rear end of an original, the surface of said contact member is cleaned by said cleaning member after the rear end of that original has passed the image reading position of said image sensor, whereby cleaning of said contact member is performed by said cleaning member after the original has passed an image reading position of said image sensor and before a subsequent original reaches the image reading position;
wherein said turning member is a roller, and said controlling unit is further configured to control said driving unit so as to rotate said roller at a first rotational speed at which the circumferential speed of said roller equals or exceeds an original conveying speed, a second rotational speed at which the circumferential speed of said roller is under the original conveying speed, and an arbitrarily-configured third rotational speed, and
wherein said controlling unit controls said driving unit so that:
said roller is rotated at the third rotational speed and the surface of said contact member is cleaned by said cleaning member before an original enters between said roller and said contact member;
said roller is rotated at the first rotational speed when the original enters between said roller and said contact member; and
the rotational speed of said roller is changed to the second rotational speed after the front end of the original has passed between said roller and said contact member.

5. An image reading apparatus as claimed in claim 4, wherein said roller assumes a stopped state when the rotational speed of said roller changes to the second rotational speed.

6. An image reading apparatus as claimed in claim 5, wherein said cleaning member is retracted to a position where said cleaning member does not interfere with the conveyed original when said roller assumes the stopped state.

7. An image reading apparatus as claimed in claim 2, wherein said turning member is a roller, and said cleaning member is disposed so as to protrude from an outer peripheral portion of said roller and inclined with respect to a line segment parallel to an axial line of said roller.

8. An image reading apparatus as claimed in claim 2, wherein said turning member is a roller, and said cleaning member is disposed so as to protrude from an outer peripheral portion of said roller and is divided into a plurality of parts in the axial direction of said roller which are not aligned in the circumferential direction of said roller.

9. An image reading apparatus comprising:
a conveying unit configured to convey an original;
an original detecting unit configured to detect at least one of a front end and a rear end of an original conveyed by said conveying unit;
an image sensor configured to read an image of the original via a contact member having a surface which an original conveyed by said conveying unit may contact;
a turning member configured to rotate or swing and disposed at a position opposing said image sensor;
a cleaning member disposed on said turning member, and configured to clean said surface of said contact member;
a driving unit configured to turn said turning member; and
a controlling unit configured to control said driving unit to turn said turning member so that, when the original detecting unit detects a front end of an original, the surface of said contact member is cleaned by said cleaning member before the front end of that original reaches the image reading position, and/or when said original detecting unit detects a rear end of an original, the surface of said contact member is cleaned by said cleaning member after the rear end of that original has passed the image reading position of said image sensor, whereby cleaning of said contact member is performed by said cleaning member after the original has passed an image reading position of said image sensor and before a subsequent original reaches the image reading position;
wherein said image reading apparatus further comprises:
a skew detecting unit configured to detect a skewed state of an original conveyed by said conveying unit, wherein said controlling unit controls said driving unit so that the movement of said turning member is changed based on detection information detected by said skew detecting unit.

10. An image reading apparatus as claimed in claim 9, wherein a skew amount of an original is acquired based on detection information detected by said skew detecting unit, and said controlling unit controls said driving unit so as to change the timing at which the surface of said contact member is cleaned by said cleaning member based on the acquired skew amount.

11. An image reading apparatus as claimed in claim 10, further comprising an original width detecting unit configured to detect a width of an original, wherein the skew amount is acquired based on detection information detected by said skew detecting unit and detection information detected by said original width detecting unit.

12. An image reading apparatus as claimed in claim 9, wherein said controlling unit controls said driving unit so that cleaning of the surface of said contact member by said cleaning member is not performed when a skew amount of an original acquired based on detection information detected by said skew detecting unit exceeds a predetermined skew amount.

13. An image reading apparatus as claimed in claim 10, further comprising a selection unit configured to select any one of a mode wherein said controlling unit controls said driving unit so as to change the timing at which the surface of said contact member is cleaned by said cleaning member when a skew amount of an original acquired based on detection information detected by said skew detecting unit exceeds a predetermined skew amount, and a mode wherein said controlling unit controls said driving unit so that cleaning of the surface of said contact member by said cleaning member is not performed when a skew amount of an original acquired based on detection information detected by said skew detecting unit exceeds a predetermined skew amount.

14. An image reading apparatus as claimed in claim 1, wherein said conveying unit is an original conveying section provided so as to be openable and/or closeable and which forms a convey path in its closed state, and
wherein said image reading apparatus further comprises either a open-close detecting unit configured to detect an opened state and/or a closed state of said original conveying section or an opening operation detecting unit configured to detect an operation to cause said original conveying section to get into an opened state, and
wherein said controlling unit controls said driving unit based on detection information detected by said open-close detecting unit or said opening operation detecting unit so as to hold said turning member at a position where said cleaning member is in an exposed state.

15. An image reading apparatus as claimed in claim 14, wherein said turning member is a roller, and further comprising a roller assembly in which said roller, a convey guide configured to guide a conveyed original in a conveying direction, and a holding member configured to hold said roller so as to be rotatable, are all integrally assembled, wherein said roller assembly is detachably disposed in said image reading apparatus.

16. An image reading apparatus as claimed in claim 15, further comprising a rotational position detecting unit configured to detect a rotational position of said roller,
wherein said controlling unit controls said driving unit so as to suspend driving that holds said roller at a rotational position where said cleaning member is in the exposed state when an opened state of said original conveying section has been detected by said open-close detecting unit and a rotational position of said roller can not be detected by said rotational position detecting unit.

17. An image reading apparatus as claimed in claim 16, wherein said controlling unit controls said driving unit so that said roller rotates by one rotation or more when said open-close detecting unit detects that said original conveying section has returned from an opened state to a closed state, and it is determined by said controlling unit that said roller assembly has not been mounted when said rotational position detecting unit is unable to detect a rotational position of said roller during the rotation of said roller.

18. An image reading apparatus as claimed in claim 16, wherein said roller is formed in a cylindrical shape by combining two semicylindrical members having arc-shaped profiles and whose colors differ from each other in brightness of colors thereof, and
wherein when said open-close detecting unit detects that said original conveying section has returned from an opened state to a closed state, said controlling unit controls said driving unit to rotate said roller based on detection information from said rotational position detecting unit so that a surface of a semicylindrical member of a current designated color among said two semicylindrical members is opposed to said image sensor.

19. An image reading apparatus as claimed in claim 18, wherein one semicylindrical member among said two semicylindrical members is a black member having a half cylindrical shape and the other semicylindrical member is a white member having a half cylindrical shape, a light intercepting portion is formed on at least one of said black member and said white member, and said rotational position detecting unit optically detects a movement of said light intercepting portion.

20. An image reading apparatus comprising:
a conveying unit configured to convey an original;
an image sensor configured to read an original image via a contact member having a surface which an original conveyed by said conveying unit may contact;
a turning member disposed at a position opposing said image sensor;
a cleaning member provided so as to protrude from said turning member and which is configured to contact said contact member and clean said surface of said contact member during turning of said turning member; and
a driving unit configured to cause said turning member to turn,
wherein said cleaning member has a shape such that not all areas of a contact portion of said cleaning member which contacts said contact member contact said contact member at one time, and
wherein said turning member is a roller, and said cleaning member is disposed so as to protrude from an outer peripheral portion of said roller and inclined with respect to a line segment parallel to an axial line of said roller.

21. A control method of an image reading apparatus which includes a conveying unit configured to convey an original, an image sensor configured to read an original image via a contact member having a surface which an original conveyed by the conveying unit may contact, a cleaning member provided on a roller disposed at a position opposing the image sensor and which is configured to clean the surface of the contact member, and a driving unit configured to turn the roller, the control method comprising:
an original detecting step of detecting an original conveyed along a convey path; and
a controlling step of controlling the driving unit to rotate said roller so that said roller is rotated according to a detection of an original in said original detecting step, wherein said controlling step enables controlling of the driving unit so as to rotate the roller at a first rotational speed at which the circumferential speed of the roller equals or exceeds an original conveying speed, a second rotational speed at which the circumferential speed of the roller is under the original conveying speed, and an arbitrarily-configured third rotational speed, and wherein the controlling step controls the driving unit so that:

the roller is rotated at the third rotational speed and the surface of said contact member is cleaned by the cleaning member before an original enters between the roller and the contact member;

the roller is rotated at the first rotational speed when the original enters between said roller and said contact member; and the rotational speed of the roller is changed to the second rotational speed after the front end of the original has passed between the roller and the contact member.

22. An image reading apparatus as claimed in claim 20, wherein the turning member is a platen roller.

23. An image reading apparatus comprising:
a conveying unit configured to convey an original;
an image sensor configured to read an original image via a contact member having a surface which an original conveyed by said conveying unit may contact;
a turning member disposed at a position opposing said image sensor;
a cleaning member provided so as to protrude from said turning member and which is configured to contact said contact member and clean said surface of said contact member during turning of said turning member; and
a driving unit configured to cause said turning member to turn,
wherein said cleaning member has a shape such that not all areas of a contact portion of said cleaning member which contacts said contact member contact said contact member at one time, and
wherein said turning member is a roller, and said cleaning member is disposed so as to protrude from an outer peripheral portion of said roller and is divided into a plurality of parts in the axial direction of said roller which are not aligned in the circumferential direction of said roller.

24. An image reading apparatus comprising:
a conveying unit configured to convey an original;
an original detecting unit configured to detect a front end of the original conveyed by said conveying unit;
an image sensor configured to read an image of the original conveyed by said conveying unit; and
a cleaning unit configured to clean a reading surface of said original detecting unit,
wherein said cleaning unit cleans the reading surface of said original detecting unit at a timing after said original detecting unit has detected the front end of the original before the front end of the original reaches the image sensor, during said conveying unit conveying the original.

25. An image reading apparatus comprising:
a conveying unit configured to convey an original;
an original detecting unit configured to detect a rear end of the original conveyed by said conveying unit;
an image sensor configured to read an image of the original conveyed by said conveying unit;
wherein said cleaning unit cleans the reading surface of said original detecting unit at a timing after said original detecting unit has detected the rear end of the original and then the rear end of the original has passed through the image sensor, during said conveying unit conveying the original.

26. A method of controlling an image reading apparatus which includes a conveying unit configured to convey an original, an original detecting unit configured to detect a front end of the original conveyed by said conveying unit, and an image sensor configured to read an image of the original conveyed by said conveying unit, said method comprising the steps of:
detecting the front end of the original; and
cleaning the reading surface of the image sensor at a timing before the front end of the original reaches the image sensor, during said conveying unit conveying the original.

27. A method of controlling an image reading apparatus which includes a conveying unit configured to convey an original, an original detecting unit configured to detect a rear end of the original conveyed by said conveying unit, and an image sensor configured to read an image of the original conveyed by said conveying unit, said method comprising the steps of:
detecting the rear end of the original; and
cleaning the reading surface of the image sensor at a timing after the rear end of the original has passed through the image sensor, during said conveying unit conveying the original.

28. An image reading apparatus comprising:
a conveying unit configured to convey an original;
an image sensor configured to read an image of the original via a contact member having a surface which an original conveyed by said conveying unit may contact;
a turning member configured to rotate or swing and disposed at a position opposing said image sensor;
a cleaning member disposed on said turning member, and adapted to clean said surface of said contact member;
a driving unit configured to turn said turning member;
a skew detecting unit configured to detect a skewed state of an original conveyed by said conveying unit; and
a controlling unit configured to control said driving unit to turn said turning member so that cleaning of said contact member is performed by said cleaning member after the original which is being conveyed by said conveying unit has passed an image reading position of said image sensor and before a subsequent original reaches the image reading position,
wherein said controlling unit controls said driving unit so that the movement of said turning member is changed based on detection information detected by said skew detecting unit.

* * * * *